(12) United States Patent
Matsumura et al.

(10) Patent No.: US 7,985,785 B2
(45) Date of Patent: *Jul. 26, 2011

(54) INK COMPOSITION AND INKJET RECORDING METHOD USING THE SAME

(75) Inventors: Tokihiko Matsumura, Kanagawa (JP); Ippei Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/013,909

(22) Filed: Jan. 14, 2008

(65) Prior Publication Data

US 2008/0182031 A1   Jul. 31, 2008

(30) Foreign Application Priority Data

Jan. 15, 2007 (JP) ................................ 2007-006019
Jan. 9, 2008 (JP) ................................ 2008-001988

(51) Int. Cl.
- *C09D 11/00* (2006.01)
- *B41J 2/01* (2006.01)
- *C09D 5/44* (2006.01)
- *C08F 2/50* (2006.01)
- *B29C 71/04* (2006.01)

(52) U.S. Cl. .............. 523/160; 523/161; 522/9; 522/10; 522/38; 522/67; 522/68; 347/1; 347/102

(58) Field of Classification Search .................. 523/160, 523/161; 522/6, 7, 8, 9, 10, 33, 36, 37, 38, 522/67, 68; 347/1, 101, 102, 224

See application file for complete search history.

(56) References Cited

U.S. PATENT DOCUMENTS

| | | | | |
|---|---|---|---|---|
| 4,134,813 | A * | 1/1979 | Kuesters et al. ................ 522/14 |
| 4,315,807 | A * | 2/1982 | Felder et al. .................... 522/33 |
| 5,145,885 | A * | 9/1992 | Berner et al. .................... 522/39 |
| 5,310,618 | A | 5/1994 | Kawamura |
| 5,534,559 | A * | 7/1996 | Leppard et al. ................. 522/64 |
| 5,707,781 | A * | 1/1998 | Wilczak ..................... 430/281.1 |
| 6,019,992 | A | 2/2000 | Carson et al. |
| 6,287,749 | B1 * | 9/2001 | Nagarajan et al. .......... 430/281.1 |
| 6,528,232 | B1 | 3/2003 | Maeda et al. |
| 2005/0146544 | A1 * | 7/2005 | Kondo ................................. 347/7 |
| 2006/0025498 | A1 | 2/2006 | Fukushige et al. |
| 2006/0128823 | A1 * | 6/2006 | Tsuchimura et al. ............ 522/71 |
| 2008/0239045 | A1 | 10/2008 | Umebayashi et al. |
| 2009/0087575 | A1 | 4/2009 | Matsumura et al. |

FOREIGN PATENT DOCUMENTS

| | | |
|---|---|---|
| DE | 4117962 A | 12/1991 |
| DE | 19501025 A | 7/1996 |
| DE | 100 54 550 A1 | 5/2001 |
| DE | 10054550 A1 | 5/2001 |
| EP | 1 757 457 A1 | 2/2007 |
| EP | 1757457 A | 2/2007 |
| EP | 1739141 A1 | 3/2007 |
| EP | 1816173 A | 8/2007 |
| EP | 1826252 A | 8/2007 |
| EP | 1 829 680 A1 | 9/2007 |
| EP | 1 927 477 A1 | 6/2008 |
| EP | 1 944 173 A1 | 7/2008 |
| EP | 1 958 994 A1 | 8/2008 |
| EP | 1 975 210 A1 | 10/2008 |
| JP | 56-143202 A | 11/1981 |
| JP | 63-060783 A | 3/1988 |
| JP | 63-60783 A | 3/1988 |
| JP | 63-235382 A | 9/1988 |
| JP | 1-253731 A | 10/1989 |
| JP | 1253731 A | 10/1989 |
| JP | 3-216379 A | 9/1991 |
| JP | 5-214280 A | 8/1993 |
| JP | 6-21256 B2 | 3/1994 |
| JP | 6-62905 B2 | 8/1994 |
| JP | 6-308727 A | 11/1994 |
| JP | 6308727 A | 11/1994 |
| JP | 08-174997 A | 7/1996 |
| JP | 3112771 B2 | 9/2000 |
| JP | 2002-241647 A | 8/2002 |
| JP | 2003-145745 A | 5/2003 |
| JP | 2003145745 A | 5/2003 |
| JP | 2004-042525 A | 2/2004 |
| JP | 2004-042548 A | 2/2004 |
| JP | 2004042548 A | 2/2004 |
| JP | 2005-096254 A | 4/2005 |

(Continued)

OTHER PUBLICATIONS

Ciba Irgacure 819 Product Information pp. 1-4, Aug. 8, 1997.*

(Continued)

*Primary Examiner* — Basia Ridley
*Assistant Examiner* — Alexander C Kollias
(74) *Attorney, Agent, or Firm* — Sughrue Mion, PLLC

(57) ABSTRACT

An ink composition of the present invention is disclosed, which contains (i) a sensitizing dye represented by the following Formula (I); (ii) at least one polymerization initiator selected from the group consisting of α-aminoketones and acyl phosphine oxides; and (iii) an ethylenically unsaturated bond-containing polymerizable compound. In Formula (I), X represents O, S or NR; n represents an integer of 0 or 1; R represents a hydrogen atom, an alkyl group or an acyl group; $R^1$ to $R^8$ each independently represent a hydrogen atom or a monovalent substituent; $R^1$ and $R^2$, $R^2$ and $R^3$, and $R^3$ and $R^4$ may be connected to each other to form a ring; and $R^5$ or $R^6$ may be connected to $R^7$ or $R^8$ to form an aliphatic ring but not to form an aromatic ring.

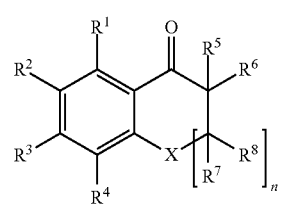

8 Claims, No Drawings

FOREIGN PATENT DOCUMENTS

| | | | |
|---|---|---|---|
| JP | 2005-512973 | A | 5/2005 |
| JP | 2006-137183 | A | 6/2006 |
| JP | 2006-137185 | A | 6/2006 |
| JP | 2006-182970 | A | 7/2006 |
| JP | 2007-231082 | A | 9/2007 |

OTHER PUBLICATIONS

Ciba Darocur TPO Product Informationm pp. -13, Aug. 29, 2001.*
Ciba Specialty Chemicals "Photoinitiators for Printing Applications: Key Products Selection Guide", Ciba Specialty Chemicals pp. 1-8 (2005).*
Ciba IRGACURE 819 Photoinitiator, Ciba Specialty Chemicals Inc, Aug. 30, 2001 pp. 1-3.*
Ciba DAROCUR TPO Photoinitiator, Ciba Specialty Chemicals Inc, Aug. 29, 2001 pp. 1-3.*
Ciba IRGACURE 907, Ciba Specialty Chemicals Inc, Sep. 4, 2001 pp. 1-3.*
Fouassier et al, "New Insights in Photosensitizers-Photoinitiators Interaction", Progress in Organic Coatings, vol. 25, issue 2, Jan. 1995 pp. 169-202.*
Andrzejewska et al "Heteroaromatic Thiols as Co-initiators for Type II Photoinitiating Systems Based on Camphorquinone and Isopropylthioxanthone", May 3, 2006 vol. 39 No. 11, pp. 3777-3785.*
Bruce M. Monroe et al., "Photoinitiators for Free-Radical-Initiated Photoimaging Systems", Chemicals Reviews, 1993, pp. 435-448, vol. 93.
Ciba IGRACURE 819 Product Information, pp. 1-4, Aug. 8, 1997.
Ciba Darocur TPO Product Information, pp. 1-3, Aug. 29, 2001.
Ciba IRGACURE 819 Photonitiator, Ciba Specialty Chemicals Inc., pp. 1-3, Aug. 30, 2001.
Ciba IRGACURE 907, Ciba Specialty ChemicalsInc., pp. 1-3, Sep. 4, 2001.
XP002580198.
Bruce M. Monroe et al., Chemical Review, vol. 93, p. 435-448(1993).
European Search Report dated Apr. 2, 2009 on EP Application No. 09000567.9.
Extended European Search Report dated Sep. 24, 2009 on EP Application corresponding to U.S. Appl. No. 12/497,558.

* cited by examiner

INK COMPOSITION AND INKJET RECORDING METHOD USING THE SAME

CROSS REFERENCE TO RELATED APPLICATIONS

This application claims priority under 35 USC 119 from Japanese Patent Application Nos. 2007-006019 and 2008-001988, the disclosures of which are incorporated herein by reference.

BACKGROUND OF THE INVENTION

1. Field of the Invention

The present invention relates to an ink composition which is suitably used for inkjet recording and to an inkjet recording method. More specifically, the present invention relates to an ink composition suitable for inkjet recording, which is cured with high sensitivity upon irradiation with active radiation rays and in which even after the ink has been cured, a cured material thereof has sufficient flexibility, and to an inkjet recording method.

2. Description of the Related Art

Examples of an image recording method for forming an image on a medium to be recorded such as paper on the basis of an image data signal include an electrophotographic mode, a sublimation type and fusion type thermal transfer mode and an inkjet mode. Since the electrophotographic mode needs a process for forming an electrostatic latent image on a photoreceptor drum by means of electrostatic charge and exposure, the system becomes complicated, resulting in high manufacturing costs. Also, in the thermal transfer mode, though an apparatus is inexpensive, an ink ribbon is used, and therefore, not only are the running costs high, but waste is generated.

On the other hand, in the inkjet mode, not only is an apparatus inexpensive, but an ink is discharged into only a required image part, thereby forming an image directly on a medium to be recorded. Therefore, the ink can be efficiently used, and the running costs are inexpensive. Furthermore, a noise is low, and this inkjet mode is excellent as an image recording mode.

As an ink composition which is curable upon irradiation with active radiation rays such as ultraviolet rays (radiation curable ink composition), for example, ink compositions which can be cured with high sensitivity to form an image with high image quality are demanded as an inkjet recording ink composition. By achieving high sensitization, advantages are achieved in that consumed electric power can be reduced and in that a load to an active radiation ray generator is decreased, whereby a high life span can be realized. Furthermore, by achieving high sensitization, since sufficient curing is achieved upon irradiation with active radiation rays, various advantages are achieved such as in that the vaporization of uncured low-molecular weight substances is suppressed and in that a lowering of the strength of a formed image is suppressed.

In recent years, an ultraviolet ray curable inkjet mode is drawing attention in view of the face that the ink has a relatively low odor and is quick-drying and that recording on a non-ink-absorbing medium to be recorded can be achieved. In particular, as disclosed in Bruce M. Monroe, et al., *Chemical Reviews*, Vol. 93 (1993), pages 435 to 448 and so on, benzil, benzoin, benzoin ethyl ether, Michler's ketone, anthraquinone, acridine, phenazine, benzophenone, 2-ethylanthraquinone and the like have been generally used as a photopolymerization initiator.

However, since photopolymerizable compositions using such a photopolymerization initiator are low in sensitivity to curing, a long time is required for image exposure for the formation of an image. For that reason, in the case of a minute image, when even a slight vibration is generated during the operation, an image with good image quality is not reproduced. Furthermore, the radiation amount of exposure energy must be increased, and the radiation of a large amount of generated heat accompanying this needs to be considered. Also, the ink to be used for the inkjet recording mode is required to have various characteristics such as physical properties being hardly changed due to storage and precipitates and the like not being generated (solution stability), and clogging of a nozzle not being generated (discharge stability).

In general, as a method for enhancing the sensitivity to radiation rays in a radiation curable photopolymerizable composition, it is disclosed in Bruce M. Monroe, et al., *Chemical Reviews*, Vol. 93 (1993), pages 435 to 448, U.S. Pat. No. 4,134,813 and JP-A Nos. 1-253731 and 6-308727 that various polymerization initiation systems are useful. However, there is no example in which a polymerization initiation system which has sufficient sensitivity to scanning exposure and has sufficient storage stability and discharge stability has been employed in an inkjet recording ink.

For that reason, an ink composition suitably useful for inkjet recording, which is cured with high sensitivity even by radiation rays of a low output, is able to form an image with high image quality and has good storage stability and discharge stability, is earnestly desired.

SUMMARY OF THE INVENTION

In order to solve the foregoing problems, the present inventors have made extensive and intensive investigations. As a result, it has been found that a specified sensitizing dye has a high sensitizing effect with respect to a specified initiator and that an ink composition using them as an initiation system has high sensitivity and good storage stability and discharge stability, leading to accomplishment of the present invention.

Specifically, an ink composition of the present invention comprises:

(i) a sensitizing dye represented by the following Formula (I);

(ii) at least one polymerization initiator selected from the group consisting of α-aminoketones and acyl phosphine oxides; and (iii) an ethylenically unsaturated bond-containing polymerizable compound.

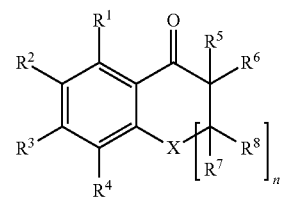

Formula (I)

In the foregoing Formula (I), X represents O, S or NR; n represents an integer of 0 or 1; R represents a hydrogen atom, an alkyl group or an acyl group; $R^1, R^2, R^3, R^4, R^5, R^6, R^7$ and $R^8$ each independently represent a hydrogen atom or a monovalent substituent; $R^1$ and $R^2$, $R^2$ and $R^3$, and $R^3$ and $R^4$ may be connected to each other to form a ring; and $R^5$ or $R^6$ may be connected to $R^7$ or $R^8$ to form an aliphatic ring but not to form an aromatic ring.

Also, an inkjet recording method of the present invention comprises:

(a) discharging the ink composition according to claim 1 onto a medium to be recorded; and (b) irradiating the discharged ink composition with active radiation rays to cure the ink composition.

DETAILED DESCRIPTION OF THE INVENTION

Ink Composition

First of all, the ink composition of the present invention is described in detail.

The ink composition of the present invention comprises (i) a sensitizing dye represented by the following Formula (I) (hereinafter properly referred to as "specified sensitizing dye"); (ii) at least one polymerization initiator selected from the group consisting of α-aminoketones and acyl phosphine oxides (hereinafter properly referred to as "specified initiator"); and (iii) an ethylenically unsaturated bond-containing polymerizable compound.

Though the action of the present invention has not been elucidated yet, it is presumed to be as follows.

In the present invention, an initiation system using a specified sensitizing dye jointly with a polymerization initiator selected from α-aminoketones and acyl phosphine oxides is employed. This specified sensitizing dye has high triplet excitation energy and efficiently causes triplet energy transfer with respect to the polymerization initiator such as α-aminoketones and acyl phosphine oxides, and it is thought that the ink composition of the present invention can be cured with high sensitivity for this reason.

Also, since the specified sensitizing dye is high in solubility and low in crystallinity as compared with generally used thioxanthone based compounds, it is thought that not only is its stability as a solution of the ink composition excellent, but when the ink composition containing this is used for inkjet recording, excellent discharge stability is obtainable.

In this way, it is thought that in the present invention, high sensitivity, solution stability and discharge stability are compatible with each other. Accordingly, the ink composition of the present invention can be suitably used for inkjet recording.

The components which are essential in the ink composition of the present invention are successively described below.

<Sensitizing Dye>

For the purpose of promoting the decomposition of the polymerization initiator upon irradiation with active beams, the ink composition of the present invention contains a sensitizing dye. As the sensitizing dye, a specified sensitizing dye as described below in detail is contained as an essential component.

In general, a sensitizing dye absorbs specified active radiation rays to be put in an electron-excited state. The sensitizing dye which has been put in an electron-excited state comes into contact with a polymerization initiator to generate an action such as electron transfer, energy transfer or heat generation, thereby promoting a chemical change in the polymerization initiator, namely decomposition or the generation of an active species such as radicals, an acid or a base. The active species as generated herein causes and promotes polymerization and curing reaction of a polymerizable compound as described later.

The sensitizing dye generates an initiation species in the polymerization initiator which is used in the ink composition, and it would be better that a compound corresponding to the wavelength of active radiation rays is used as the sensitizing dye. Taking into consideration the use in a curing reaction of a general ink composition, examples of the preferred sensitizing dye include those having absorption wavelength in the range of from 350 nm to 450 nm. The ink composition of the present invention is required to contain one or more kinds of specified sensitizing dyes belonging to the following compound group.

(i) Sensitizing dye represented by the Formula (I)

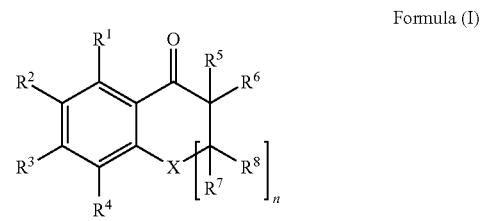

Formula (I)

In the foregoing Formula (I), X represents O (oxygen atom), S (sulfur atom) or NR, wherein R represents a hydrogen atom, an alkyl group or an acyl group, and preferably an alkyl group or an acyl group; and n represents 0 or 1.

X is preferably O or S, and more preferably S.

Here, when n is 0, a carbon atom bonding to $R^7$ and $R^8$ does not exist, but X containing a hetero atom and a carbon atom to, which $R^5$ and $R^6$ bond, are directly bonded to each other, thereby forming an X-containing 5-membered heterocycle.

$R^1$, $R^2$, $R^3$, $R^4$, $R^5$, $R^6$, $R^7$ and $R^8$ each independently represent a hydrogen atom or a monovalent substituent.

Examples of the monovalent substituent represented by $R^1$, $R^2$, $R^3$, $R^4$, $R^5$, $R^6$, $R^7$ and $R^8$ include a halogen atom, an aliphatic group, an aromatic group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphoryl group, an acyl group, a carboxyl group and a sulfo group. Among them, an alkyl group and a halogen atom are preferable.

In Formula (I), when $R^1$, $R^2$, $R^3$, $R^4$, $R^5$, $R^6$, $R^7$ and $R^8$ are each an alkyl group, examples of the preferred alkyl group include alkyl groups having from 1 to 10 carbon atoms, and more preferably alkyl groups having from 1 to 4 carbon atoms, for example, a methyl group, an ethyl group, a propyl group, an n-butyl group, a sec-butyl group and a t-butyl group.

When $R^1$, $R^2$, $R^3$, $R^4$, $R^5$, $R^6$, $R^7$ and $R^8$ are each an alkoxy group, examples of the preferred alkoxy group include alkoxy groups having from 1 to 4 carbon atoms, for example, a methoxy group, an ethoxy group, a hydroxyethoxy group, a propoxy group, an n-butoxy group, an isobutoxy group, a sec-butoxy group and a t-butoxy group.

When $R^1$, $R^2$, $R^3$, $R^4$, $R^5$, $R^6$, $R^7$ and $R^8$ are each a halogen atom, examples of the halogen atom include a fluorine atom, a chlorine atom, a bromine atom and an iodine atom.

$R^1$ and $R^2$, $R^2$ and $R^3$, and $R^3$ and $R^4$ may be connected to (for example, fused with) each other to form a ring.

When these substituents form a ring, examples of the ring structure include 5- to 6-membered aliphatic rings and aromatic rings, and heterocycles containing an element other than a carbon atom are also included. Also, the formed rings may be further combined with each other to form a binuclear ring, for example, a fused ring. Furthermore, such a ring structure may further have each of the substituents as exemplified in the case where $R^1$ to $R^8$ each represents a monovalent substituent in the foregoing Formula (I). When the formed ring structure is a heterocycle, examples of the hetero atom include N, O and S.

When n in Formula (I) is 1, $R^5$ or $R^6$ may be connected to $R^7$ or $R^8$ to form an aliphatic ring but not to form an aromatic ring. The aliphatic ring structure formed is preferably a 3- to 6-membered aliphatic ring, and more preferably a 5- or 6-membered aliphatic ring.

Examples of the sensitizing dye which can be more suitably used include a sensitizing dye represented by the following Formula (I-A).

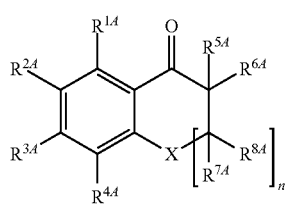

Formula (I-A)

In the foregoing Formula (I-A), X represents O or S; n represents 0 or 1; $R^{1A}$, $R^{2A}$, $R^{3A}$, $R^{4A}$, $R^{5A}$, $R^{6A}$, $R^{7A}$ and $R^{8A}$ each independently represent a hydrogen atom, a halogen atom, a hydroxyl group, a cyano group, a nitro group, an amino group, an alkylthio group, an alkylamino group, an alkoxy group, an alkoxycarbonyl group, an acyloxy group, an acyl group, a carboxyl group or a sulfo group; and $R^{1A}$ and $R^{2A}$, $R^{2A}$ and $R^{3A}$, and $R^{3A}$ and $R^{4A}$ may be connected to (for example, fused with) each other to form a ring, wherein the formed ring is synonymous with that as defined in Formula (I).

$R^{5A}$ or $R^{6A}$ may be connected to (for example, fused with) $R^{7A}$ or $R^{8A}$ to form an aliphatic ring but not to form an aromatic ring, wherein the formed aliphatic ring is the same as that as defined in Formula (I).

Examples of the sensitizing dye which can be further suitably used include a sensitizing dye represented by the following Formula (I-B).

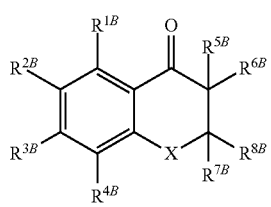

Formula (I-B)

In the foregoing Formula (I-B), X represents O or S; $R^{1B}$, $R^{2B}$, $R^{3B}$, $R^{4B}$, $R^{5B}$, $R^{6B}$, $R^{7B}$ and $R^{8B}$ each independently represent a hydrogen atom, a halogen atom, a hydroxyl group, a cyano group, a nitro group, an amino group, an alkylthio group, an alkylamino group, an alkoxy group, an alkoxycarbonyl group, an acyloxy group, an acyl group, a carboxyl group or a sulfo group; and $R^{1B}$ and $R^{2B}$, $R^{2B}$ and $R^{3B}$, and $R^{3B}$ and $R^{4B}$ may be connected to (for example, fused with) each other to form a ring, wherein the formed aliphatic ring is synonymous with that as defined in Formula (I).

$R^{5B}$ or $R^{6B}$ may be connected to (for example, fused with) $R^{7B}$ or $R^{8B}$ to form an aliphatic ring but not to form an aromatic ring, wherein the formed aliphatic ring is the same as that as defined in Formula (I).

Examples of the sensitizing dye which can be even further suitably used include a sensitizing dye represented by the following Formula (I-C).

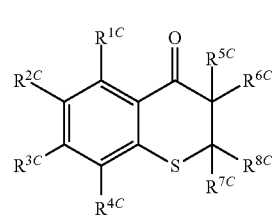

Formula (I-C)

In the foregoing Formula (I-C), $R^{1C}$, $R^{2C}$, $R^{3C}$, $R^{4C}$, $R^{C5}$, $R^{C6}$, $R^{C7}$ and $R^{8C}$ each independently represent a hydrogen atom, a halogen atom, a hydroxyl group, a cyano group, a nitro group, an amino group, an alkylthio group, an alkylamino group, an alkoxy group, an alkoxycarbonyl group, an acyloxy group, an acyl group, a carboxyl group or a sulfo group.

$R^{1C}$ and $R^{2C}$, $R^{2C}$ and $R^{3C}$, and $R^{3C}$ and $R^{4C}$ may be fused with each other to form a 5- or 6-membered aliphatic ring or an aromatic ring. The formed ring may also be a heterocycle containing an element other than a carbon atom, and the formed rings may be further combined with each other to form a binuclear ring, for example, a fused ring. Furthermore, such a ring structure may further have each of the substituents as exemplified in the case where $R^1$, $R^2$, $R^3$, $R^4$, $R^5$, $R^6$, $R^7$ and $R^8$ each represents a monovalent substituent in the foregoing Formula (I). When the formed ring structure is a heterocycle, examples of the hetero atom include N, O and S.

$R^{5C}$ or $R^{6C}$ may be connected to (for example, fused with) $R^{7C}$ or $R^{8C}$ to form an aliphatic ring but not to form an aromatic ring, wherein the formed aliphatic ring is the same as that as defined in Formula (I).

At least one of $R^{1C}$, $R^{2C}$, $R^{3C}$, $R^{4C}$, $R^{5C}$, $R^{6C}$, $R^{7C}$ and $R^{8C}$ is preferably a halogen atom, and the substituent position substituted with halogen atoms is preferably $R^{1C}$, $R^{2C}$, $R^{3C}$ or $R^{4C}$, and more preferably $R^{2C}$. The number of halogen atoms is preferably one or two, and more preferably one.

$R^{2C}$ is preferably a substituent other than a hydrogen atom, more preferably an alkyl group, a halogen atom, an acyloxy group or an alkoxycarbonyl group, and still more preferably an alkyl group or a halogen atom from the viewpoint of high sensitivity matching with the light source.

Either one of $R^{7C}$ and $R^{8C}$ is preferably a substituent other than a hydrogen atom, and more preferably, both of $R^{7C}$ and $R^{8C}$ are substituents other than hydrogen atoms. Examples of the preferred substituents include an alkyl group, a halogen atom, an acyloxy group and an alkoxycarbonyl group. Among these, an alkyl group and an alkoxycarbonyl group are more preferable, and an alkyl group is still more preferable.

Examples of halogen atoms include a fluorine atom, a chlorine atom, a bromine atom and an iodine atom, and a chlorine atom, a bromine atom and an iodine atom are preferred.

Examples of the preferred alkyl group include alkyl groups having from 1 to 10 carbon atoms, and more preferably alkyl groups having from 1 to 4 carbon atoms; for example, a methyl group, an ethyl group, a propyl group, an n-butyl group, a sec-butyl group or a t-butyl group.

Examples of the preferred acyloxy group include aliphatic acyloxy groups having from 2 to 10 carbon atoms, and more preferably aliphatic acyloxy groups having from 2 to 5 carbon atoms.

Examples of the preferred alkoxycarbonyl group include aliphatic alkoxycarbonyl groups having from 2 to 10 carbon atoms, and more preferably aliphatic alkoxycarbonyl groups having from 2 to 5 carbon atoms.

Specific examples of the specified sensitizing dye which can be suitably used in the present invention are given below [Illustrative Compounds (I-1) to (I-133)], but it should not be construed that the present invention is limited thereto.

(I-1)
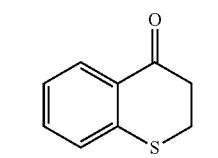

(I-2)
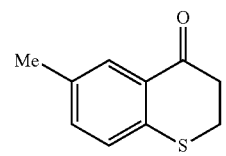

(I-3)
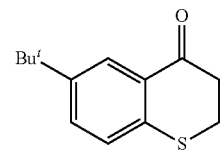

(I-4)
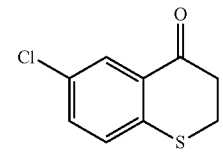

(I-5)
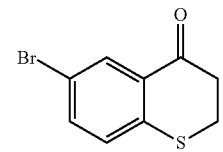

(I-6)
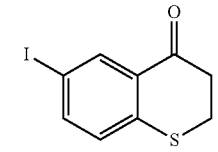

(I-7)
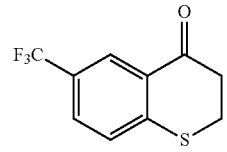

-continued (I-8)
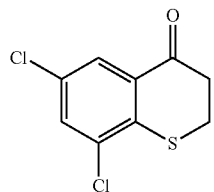

(I-9)
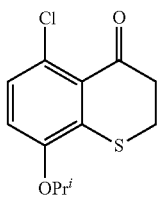

(I-10)
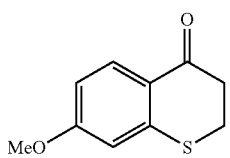

(I-11)
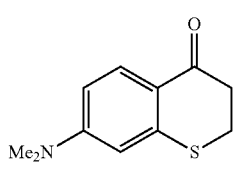

(I-12)
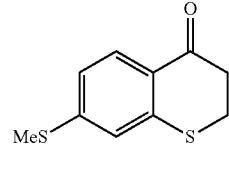

(I-13)
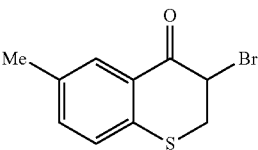

(I-14)
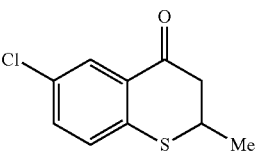

(I-15)
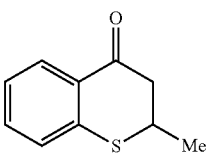

(I-16)

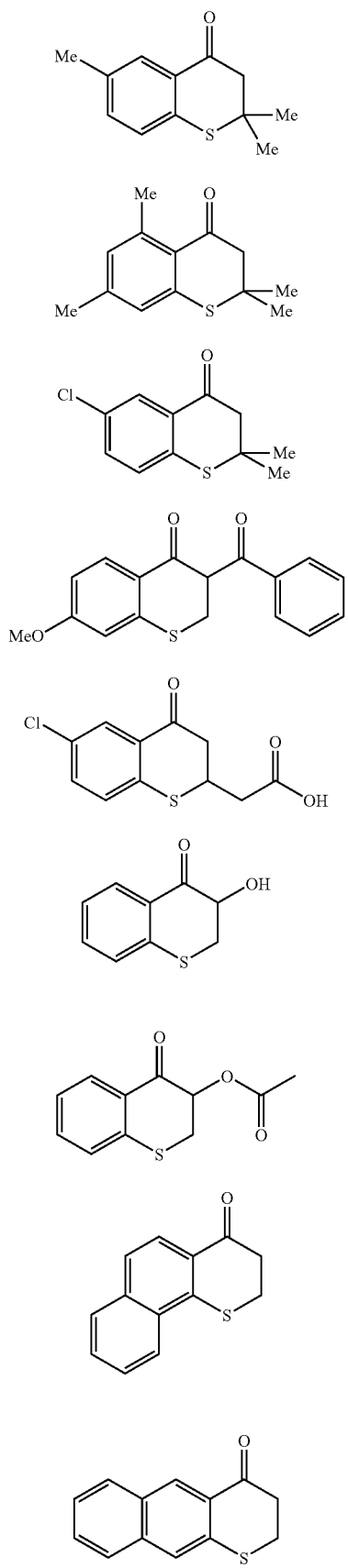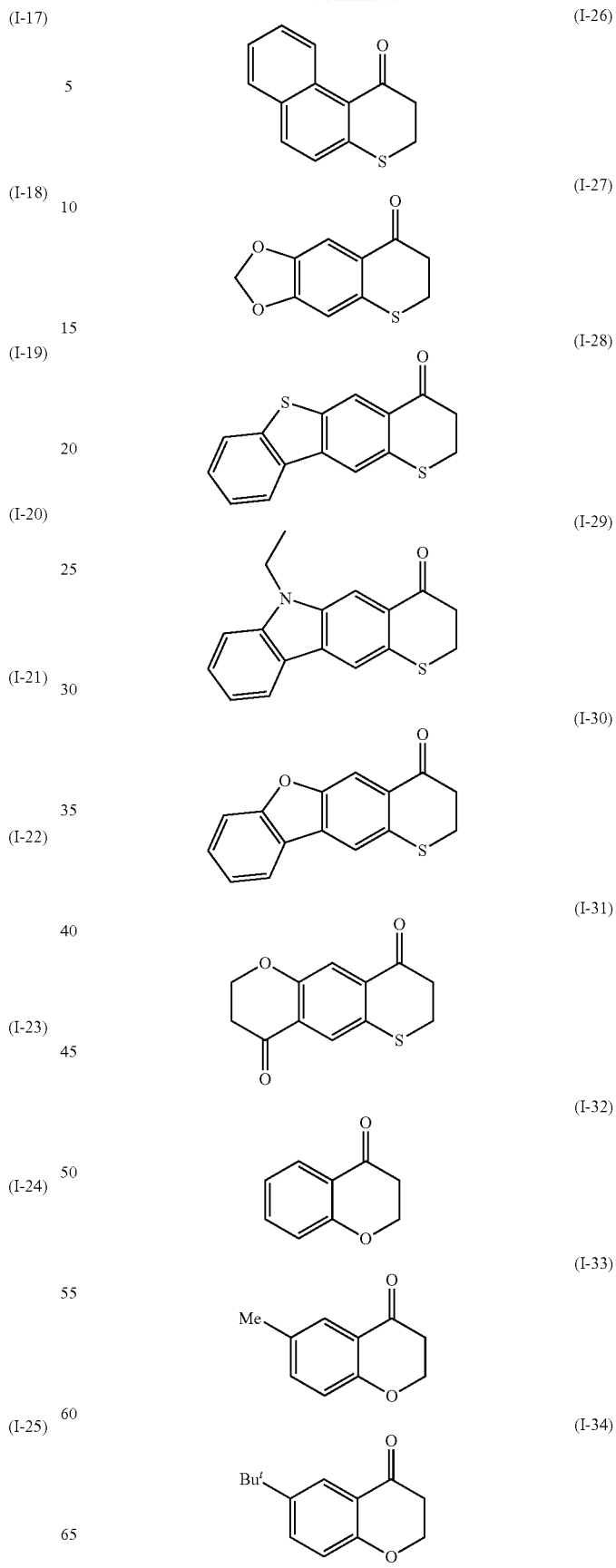

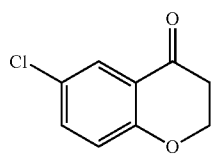 (I-35)
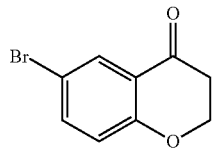 (I-36)
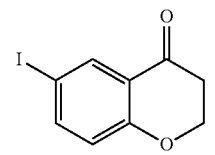 (I-37)
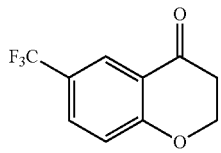 (I-38)
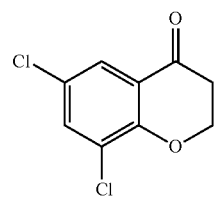 (I-39)
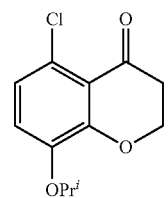 (I-40)
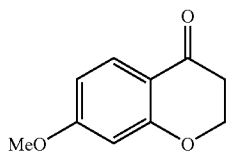 (I-41)
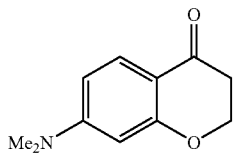 (I-42)
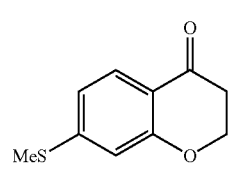 (I-43)
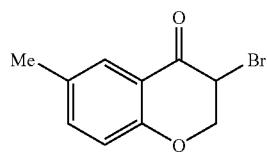 (I-44)
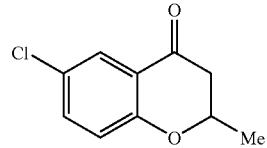 (I-45)
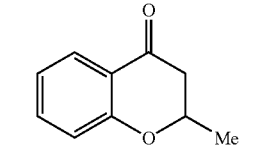 (I-46)
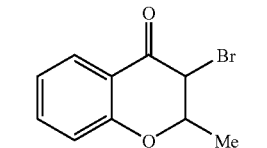 (I-47)
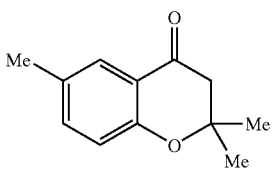 (I-48)
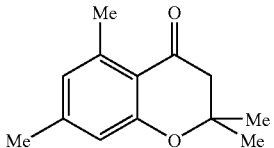 (I-49)
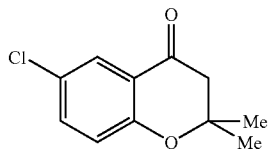 (I-50)
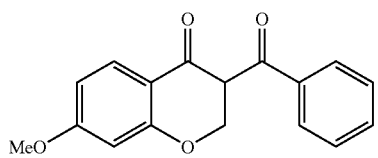 (I-51)
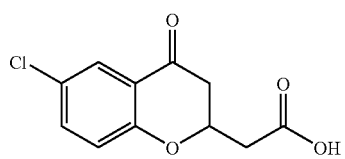 (I-52)
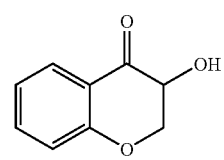 (I-53)

(I-54) 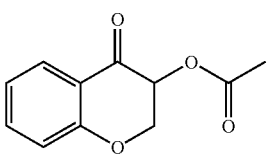
(I-55) 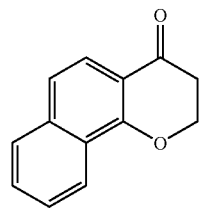
(I-56) 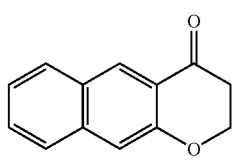
(I-57) 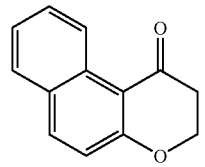
(I-58) 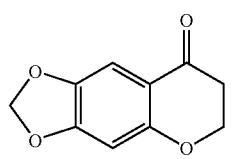
(I-59) 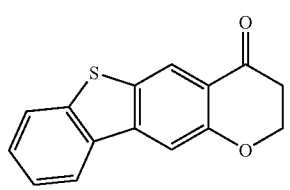
(I-60) 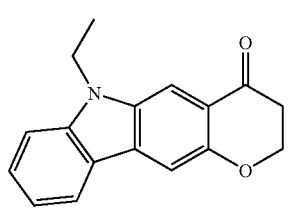
(I-61) 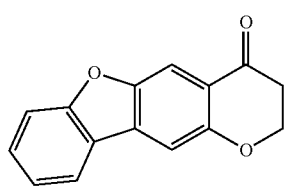
(I-62) 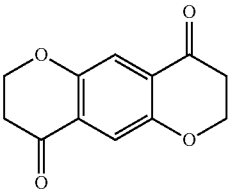
(I-63) 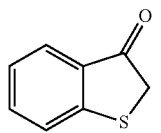
(I-64) 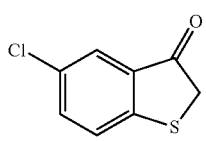
(I-65) 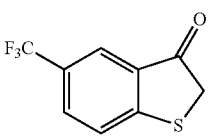
(I-66) 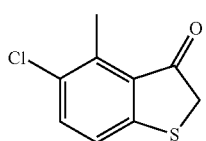
(I-67) 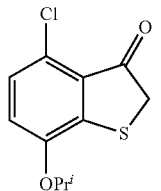
(I-68) 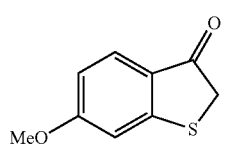
(I-69) 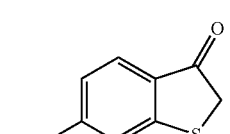
(I-70) 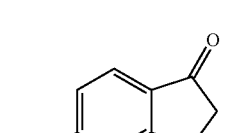
(I-71) 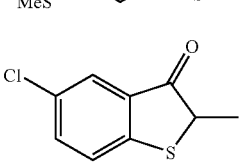

-continued
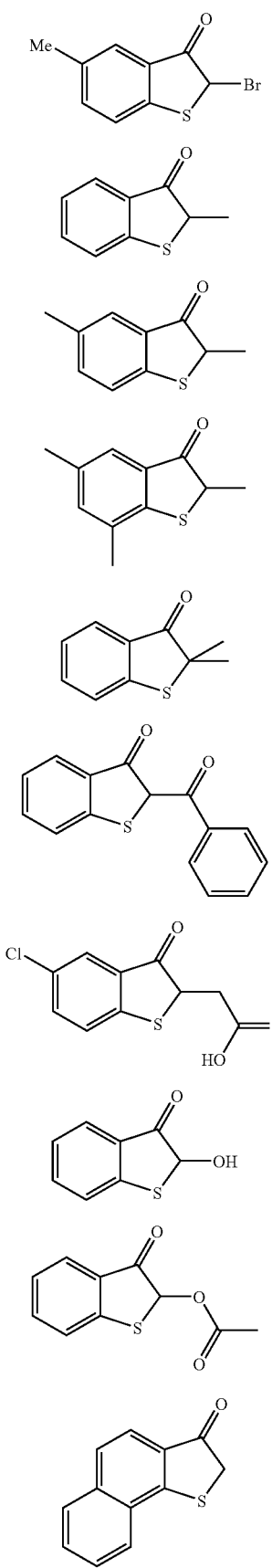
(I-72)
(I-73)
(I-74)
(I-75)
(I-76)
(I-77)
(I-78)
(I-79)
(I-80)
(I-81)
-continued
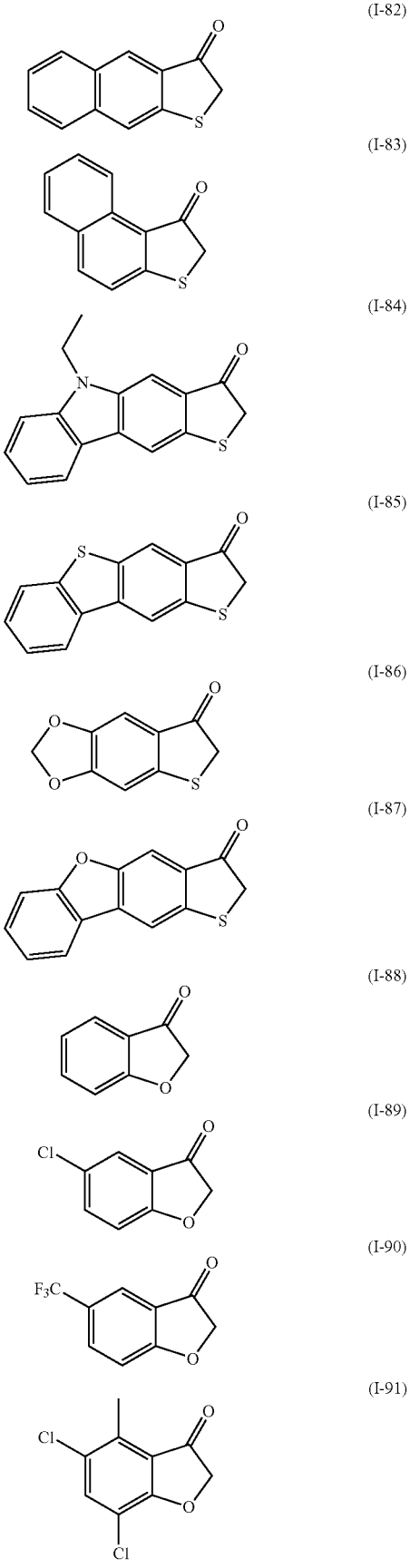
(I-82)
(I-83)
(I-84)
(I-85)
(I-86)
(I-87)
(I-88)
(I-89)
(I-90)
(I-91)

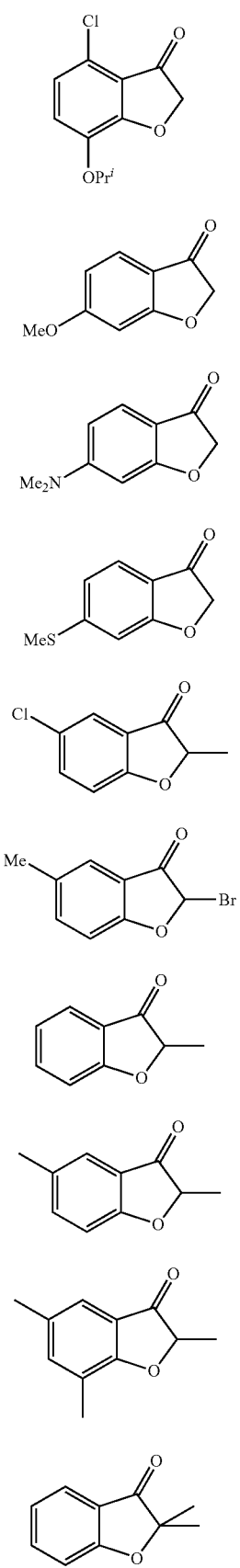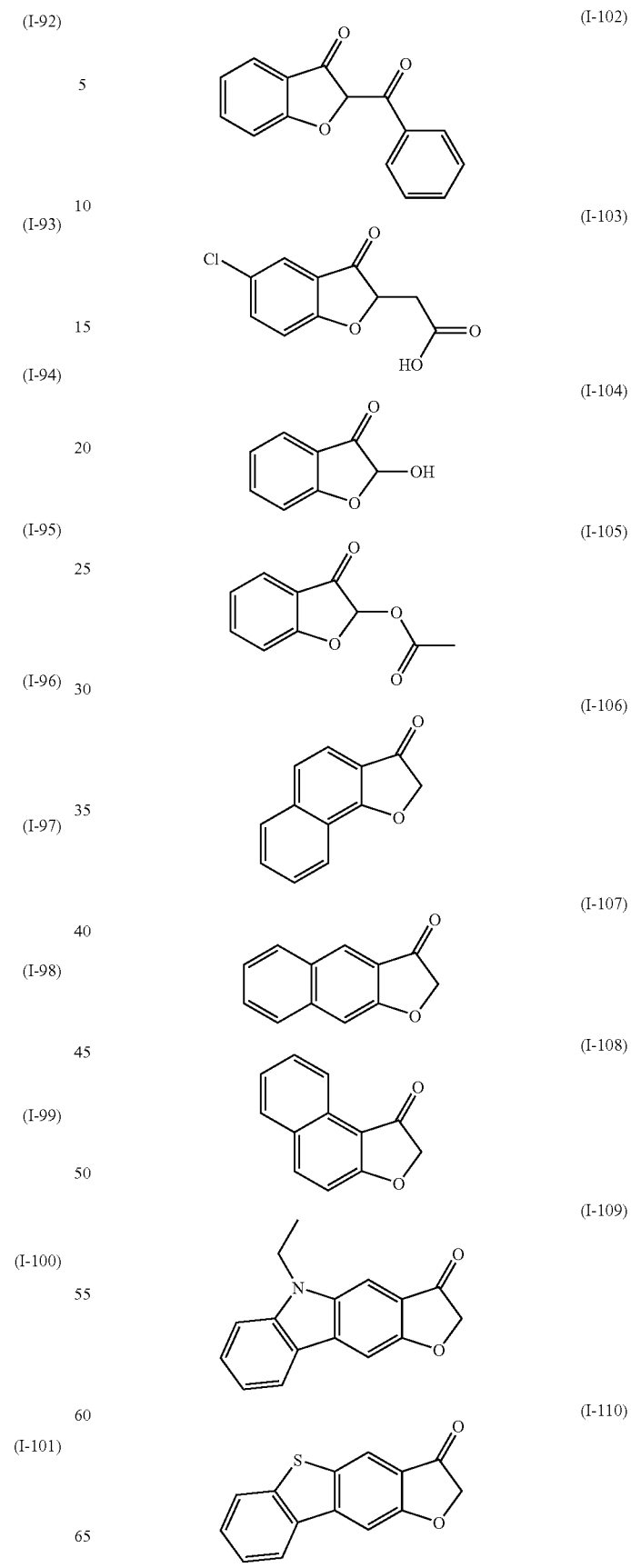

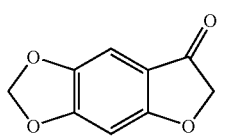
(I-111)
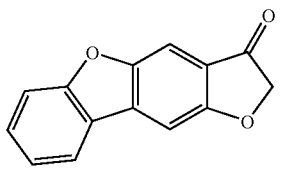
(I-112)
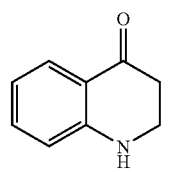
(I-113)
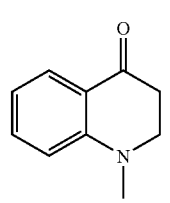
(I-114)
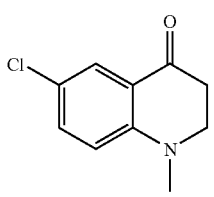
(I-115)
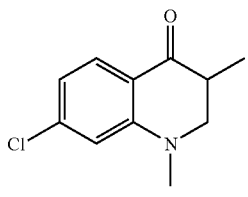
(I-116)
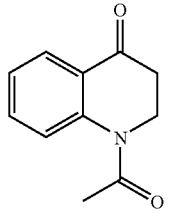
(I-117)
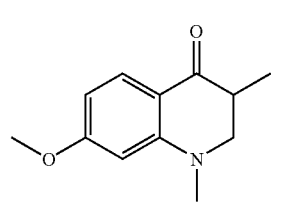
(I-118)
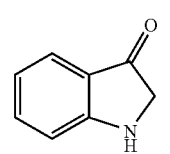
(I-119)
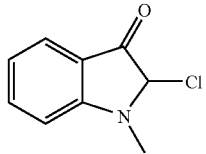
(I-120)
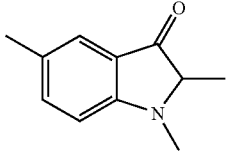
(I-121)
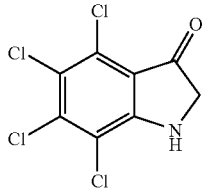
(I-122)
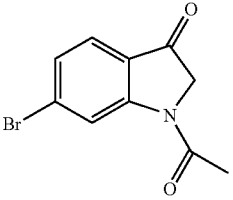
(I-123)
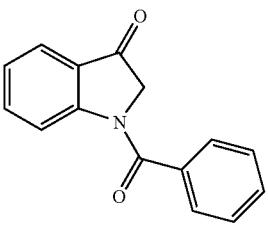
(I-124)
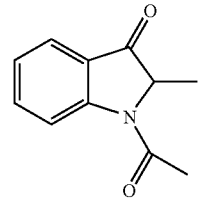
(I-125)
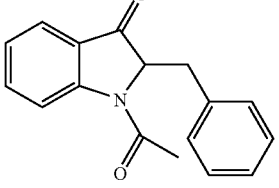
(I-126)
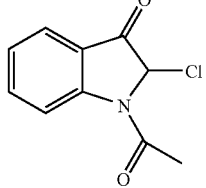
(I-127)

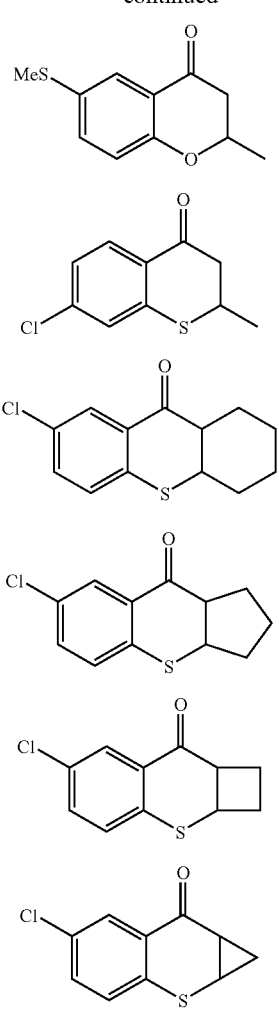

The specified sensitizing dye according to the present invention can be synthesized by a known method as described in, for example, JP-A No. 2004-189695; *Tetrahedron*, Vol. 49, page 939 (1993); *Journal of Organic Chemistry*, page 893 (1945); and *Journal of Organic Chemistry*, page 4939 (1965).

The content of the specified sensitizing dye in the ink composition of the present invention is preferably from about 0.05 to about 30% by mass, more preferably from 0.1 to 20% by mass, and further preferably from 0.2 to 10% by mass in terms of a solid content relative to the ink composition.

This specified sensitizing dye has an advantage such as in that even when the specified sensitizing dye is added in an amount at which the effects can be revealed, there is no fear that the hue of the ink composition is adversely affected because it does not substantially have absorption in a visible light region.

Speaking the relationship of the content of the specified sensitizing dye with a polymerization initiator as described later, it is suitable that the specified sensitizing dye is contained in an amount of from 200/1 to 1/200, preferably from 50/1 to 1/50, and more preferably from 20/1 to 1/5 in terms of a mass ratio of the specified polymerization initiator to the specified sensitizing dye.

[Other Sensitizing Dye]

In the present invention, in addition to the foregoing specified sensitizing dye, a known sensitizing dye can be used jointly so far as the effects of the present invention are not impaired. This other sensitizing dye can be added in an amount of from 1/5 to 100/1, preferably from 1/1 to 100/1, and more preferably from 2/1 to 100/1 to the specified sensitizing dye in terms of a mass ratio of the specified sensitizing dye to this other sensitizing dye.

Examples of the known sensitizing dye which can be used jointly include benzophenones, thioxanthones, especially isopropylthioxanthone, anthraquinone and 3-acylcoumarin derivatives, terphenyl, styryl ketone and 3-(aroylmethylene) thiazolines, camphor quinone, eosin, rhodamine and erythrosine.

Further examples of photosensitizers which can be used jointly are as follows.

(1) Thioxanthones:

Thioxanthone, 2-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothio-xanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di-[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboximide, N-(1,1,3,3-tetra-methylbutyl)thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester and 2-hydroxy-3-(3,4-dimethyl-9-oxo-9H-thioxanthon-2-yloxy)-N,N,N-trimethyl-1-propaneaminium chloride.

(2) Benzophenones:

Benzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)-benzophenone, 4-(4-tolylthio)benzophenone, 4-benzoyl-N,N,N-trimethylbenzenemethaneaminium chloride, 2-hydroxy-3-(4-benzoylphenoxy)-N,N,N-trimethyl-1-propaneaminium chloride monohydrate, 4-(13-acryloyl-1,4, 7,10,13-pentaoxamidecyl)benzophenone and 4-benzoyl-N, N-dimethyl-N-[2-(1-oxo-2-propenyl)oxy] ethylbenzenemethaneaminium chloride.

(3) 3-Acylcoumarins:

3-Benzoylcoumarin, 3-benzoyl-7-methoxycoumarin, 3-benzoyl-5,7-di(propoxy)coumarin, 3-benzoyl-6,8-dichlorocoumarin, 3-benzoyl-6-chlorocoumarin, 3,3'-carbonylbis-[5,7-di(propoxy)coumarin], 3,3'-carbonylbis(7-methoxycoumarin), 3,3'-carbonylbis(7-diethylaminocoumarin), 3-isobutyroylcoumarin, 3-benzoyl-5,7-dimethoxycoumarin, 3-benzoyl-5,7-diethoxycoumarin, 3-benzoyl-5,7-dibutoxycoumarin, 3-benzoyl-5,7-di(methoxyethoxy)coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)coumarin, 5,7-diethoxy-3-(1-naphthoyl)coumarin, 3-benzoylbenzo[f]coumarin, 7-diethylamino-3-thienoylcoumarin and 3-(4-cyanobenzoyl)-5,7-dimethoxycoumarin.

(4) 3-(Aroylmethylene)thiazolines:
3-Methyl-2-benzoylmethylene-β-naphthothiazoline, 3-methyl-2-benzoylmethylene-benzothiazoline and 3-ethyl-2-propionylmethylene-β-naphthothiazoline.

(5) Anthracenes:
9,10-Dimethoxy-anthracene, 9,10-diethoxy-anthracene and 9,10-dimethoxy-2-ethyl-anthracene.

(6) Other Carbonyl Compounds:
Acetophenone, 3-methoxyacetophenone, 4-phenylacetophenone, benzil, 2-acetylnaphthalene, 2-naphthaldehyde, 9,10-naphthraquinone, 9-fluorenone, dibenzosuberone, xanthene, 2,5-bis(4-diethylaminobenzylidene)cyclopentanone, α-(p-dimethylaminobenzylidene)ketones, for example, 2-(4-dimethylaminobenzylidene)indan-1-one and 3-(4-dimethylaminophenyl)-1-indan-5-ylpropenone, 3-phenylthiophthalimide and N-methyl-3,5-di(ethylthio)phthalimide.

<Polymerization Initiator>

The ink composition of the present invention contains a polymerization initiator.

Though the present invention is characterized by containing a specified polymerization initiator as described below in detail, a known polymerization initiator can also be used jointly. It is preferred to use a radical polymerization initiator as the polymerization initiator in the present invention.

(ii) Polymerization Initiator Selected from the Group Consisting of α-Aminoketones and Acyl Phosphine Oxides The specified polymerization initiator which is a characteristic component in the present invention is hereunder described in detail.

The polymerization initiator which is suitably used in the present invention is a photopolymerization initiator selected from the group consisting of α-aminoketones and acyl phosphine oxides.

The α-aminoketone based compound which is the specified polymerization initiator is a compound represented by the following Formula (1).

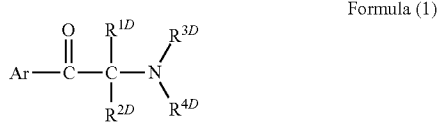

Formula (1)

In the foregoing Formula (1), Ar represents a phenyl group substituted with —SR$^{13}$ or —N(R$^{7E}$)(R$^{8E}$); R$^{13}$ represents a hydrogen atom or an alkyl group.

R$^{1D}$ and R$^{2D}$ each independently represent an alkyl group having from 1 to 8 carbon atoms. R$^{1D}$ and R$^{2D}$ may be bonded to each other to form an alkylene group having from 2 to 9 carbon atoms. R$^{3D}$ and R$^{4D}$ each independently represent a hydrogen atom; an alkyl group having from 1 to 12 carbon atoms; an alkyl group having from 2 to 4 carbon atoms, which is substituted with an alkoxy group having from 1 to 4 carbon atoms; or an alkenyl group having from 3 to 5 carbon atoms. Here, R$^{3D}$ and R$^{4D}$ may be bonded to each other to form an alkylene group having from 3 to 7 carbon atoms. The formed alkylene group may be one containing —O— or —N(R$^{12}$)— in the alkylene chain thereof, wherein R$^{12}$ represents an alkyl group having from 1 to 4 carbon atoms.

R$^{7E}$ and R$^{8E}$ each independently represent a hydrogen atom; an alkyl group having from 1 to 12 carbon atoms; an alkyl group having from 2 to 4 carbon atoms, which is substituted with an alkoxy group having from 1 to 4 carbon atoms; or an alkenyl group having from 3 to 5 carbon atoms. Here, R$^{7E}$ and R$^{8E}$ may be bonded to each other to form an alkylene group having from 3 to 7 carbon atoms, and the alkylene group may be one containing —O— or —N(R$^{12}$)— in the alkylene chain thereof, wherein R$^{12}$ is synonymous with that as defined above.

Examples of compounds which are included in the foregoing α-aminoketone include 2-methyl-1-phenyl-2-morpholinopropan-1-one, 2-methyl-1-[4-(hexyl)phenyl]-2-morpholinopropan-1-one and 2-ethyl-2-dimethyamino-1-(4-morpholinophenyl)-butanone-1.

Also, the compound is available as a commercial product, for example, IRGACURE Series, manufactured by Ciba-Geigy AG; including IRGACURE 907, IRGACURE 369 and IRGACURE 379. These are a compound included in the α-aminoketone and can be suitably used in the present invention.

Compounds which are included in the foregoing acyl phosphine oxide are a compound represented by the following Formula (2) or Formula (3).

Formula (2)

In the foregoing Formula (2), R$^{5D}$ and R$^{6D}$ each independently represent an aliphatic group, an aromatic group, an aliphatic oxy group, an aromatic oxy group or a heterocyclic group; and R$^{7D}$ represents an aliphatic group, an aromatic group or a heterocyclic group.

Examples of the foregoing aliphatic group represented by R$^{5D}$, R$^{6D}$ or R$^{7D}$ include an alkyl group, a substituted alkyl group, an alkenyl group, a substituted alkenyl group, an alkynyl group, a substituted alkynyl group, an aralkyl group or a substituted aralkyl group. Among them, an alkyl group, a substituted alkyl group, an alkenyl group, a substituted alkenyl group, an aralkyl group and a substituted aralkyl group are preferable, with an alkyl group and a substituted alkyl group being especially preferable. Also, the foregoing aliphatic group may be either a cyclic aliphatic group or a chain aliphatic group. The chain aliphatic group may be branched.

Examples of the foregoing alkyl group include linear, branched or cyclic alkyl groups. The carbon atom number of the alkyl group is preferably from 1 to 30, and more preferably from 1 to 20. A preferred range of the carbon atom number of the alkyl moiety of the substituted alkyl group is the same as in the case of the alkyl group. The foregoing alkyl group may be either an alkyl group having a substituent or an unsubstituted alkyl group. Examples of the foregoing alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, a cyclopentyl group, a neopentyl group, an isopropyl group and an isobutyl group.

Examples of the substituent of the foregoing substituted alkyl group include a carboxyl group, a sulfo group, a cyano group, a halogen atom (for example, a fluorine atom, a chlorine atom and a bromine atom), a hydroxyl group, an alkoxycarbonyl group having not more than 30 carbon atoms (for example, a methoxycarbonyl group, an ethoxycarbonyl group and a benzyloxycarbonyl group), an alkylsulfonylaminocarbonyl group having not more than 30 carbon atoms, an aryl-sulfonylaminocarbonyl group, an alkylsulfonyl group, an arylsulfonyl group, an acylaminosulfonyl group having not more than 30 carbon atoms, an alkoxy group having not more than 30 carbon atoms (for example, a methoxy group, an ethoxy group, a benzyloxy group, a phenoxyethoxy group and a phenethyloxy group), an alkylthio group having not more than 30 carbon atoms (for example, a methylthio group, an ethylthio group and a methylthioethylthioethy group) and an aryloxy group having not more than 30 carbon atoms (for example, a phenoxy group, a p-tolyloxy group, a 1-naphthoxy group and a 2-naphthoxy group), a nitro group, an alkyl group having not more than 30 carbon atoms, an alkoxycarbonyloxy group, an aryloxycarbonyloxy group, an acyloxy group having not more than 30 carbon atoms (for example, an acetyloxy group and a propionyloxy group), an acyl group having not more than 30 carbon atoms (for example, an acetyl group, a propionyl group and a benzoyl group), a carbamoyl group (for example, a carbamoyl group, an N,N-dimethylcarbamoyl group, a morpholinocarbonyl group and a piperidinocarbonyl group), a sulfamoyl group (for example, a sulfamoyl group, an N,N-dimethylsulfamoyl group, a morpholinosulfonyl group and a piperidinosulfonyl group), an aryl group having not more than 30 carbon atoms (for example, a phenyl group, a 4-chlorophenyl group, a 4-methylphenyl group and an α-naphthyl group), a substituted amino group (for example, an amino group, an alkylamino group, a dialkylamino group, an arylamino group, a diarylamino group and an acylamino group), a substituted ureido group, a substituted phosphono group and a heterocyclic group. Here, the carboxyl group, the sulfo group, the hydroxyl group and the phosphono group may be a in a salt state. On that occasion, examples of a cation capable of forming a salt include M⁺ as described later.

Examples of the foregoing alkenyl group include linear, branched or cyclic alkenyl groups. The carbon atom number of the alkenyl group is preferably from 2 to 30, and more preferably from 2 to 20. The alkenyl group may be either a substituted alkenyl group having a substituent or an unsubstituted alkenyl group. A preferred range of the carbon atom number of the alkenyl moiety of the substituted alkenyl group is the same as in the case of the alkenyl group. Examples of the substituent of the foregoing substituted alkenyl group include the same substituents as in the case of the foregoing substituted alkyl group.

Examples of the foregoing alkynyl group include linear, branched or cyclic alkynyl groups. The carbon atom number of the alkynyl group is preferably from 2 to 30, and more preferably from 2 to 20. The alkynyl group may be either a substituted alkynyl group having a substituent or an unsubstituted alkynyl group. A preferred range of the carbon atom number of the alkynyl moiety of the substituted alkynyl group is the same as in the case of the alkynyl group. Examples of the substituent of the foregoing substituted alkynyl group include the same substituents as in the case of the foregoing substituted alkyl group.

Examples of the foregoing aralkyl group include linear, branched or cyclic aralkyl groups. The carbon atom number of the aralkyl group is preferably from 7 to 35, and more preferably from 7 to 25. The subject aralkyl group may be either a substituted aralkyl group having a substituent or an unsubstituted aralkyl group. A preferred range of the carbon atom number of the aralkyl moiety of the substituted aralkyl group is the same as in the case of the aralkyl group. Examples of the substituent of the foregoing substituted aralkyl group include the same substituents as in the case of the foregoing substituted alkyl group.

Examples of the foregoing aromatic group represented by $R^{5D}$, $R^{6D}$ or $R^{7D}$ include an aryl group and a substituted aryl group. The carbon atom number of the aryl group is preferably from 6 to 30, and more preferably from 6 to 20. A preferred range of the carbon atom number of the aryl moiety of the substituted aryl group is the same as in the case of the aryl group. Examples of the foregoing aryl group include a phenyl group, an α-naphthyl group and a β-naphthyl group. Examples of the substituent of the foregoing substituted aryl group include the same substituents as in the case of the foregoing substituted alkyl group.

As the foregoing aliphatic oxy group represented by $R^{5D}$ or $R^{6D}$, an alkoxy group having from 1 to 30 carbon atoms is preferable. Examples thereof include a methoxy group, an ethoxy group, a butoxy group, an octyloxy group and a phenoxyethoxy group. However, it should not be construed that the present invention is limited thereto.

As the foregoing aromatic oxy group represented by $R^{5D}$ or $R^{6D}$, an aryloxy group having from 6 to 30 carbon atoms is preferable. Examples thereof include a phenoxy group, a methylphenyloxy group, a chlorophenyloxy group, a methoxyphenyloxy group and an octyloxyphenyloxy group. However, it should not be construed that the present invention is limited thereto.

As the foregoing heterocyclic group represented by $R^{5D}$, $R^{6D}$ or $R^{7D}$, a heterocyclic group containing an N, O or S atom is preferable. Examples thereof include a pyridyl group, a furyl group, a thienyl group, an imidazolyl group and a pyrrolyl group.

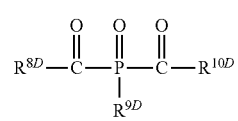

Formula (3)

In the foregoing Formula (3), $R^{8D}$ and $R^{10D}$ each independently represent an alkyl group, an aryl group or a heterocyclic group; and $R^{9D}$ represents an alkyl group, an aryl group, an alkoxy group, an aryloxy group or a heterocyclic group. The foregoing alkyl group, aryl group, heterocyclic group, alkoxy group and aryloxy group represented by $R^{8D}$, $R^{9D}$ or $R^{10D}$ may each have a substituent, and examples of the substituent include the same substituents as in the case of the Formula (2).

The alkyl group, the aryl group, the heterocyclic group, the alkoxy group and the aryloxy group in the foregoing Formula (3) are synonymous with those in the foregoing Formula (2).

Examples of the acyl phosphine oxide based compound represented by the foregoing Formula (2) or (3) include compounds described in, for example, JP-B Nos. 63-40799 and 5-29234 and JP-A Nos. 10-95788 and 10-29997.

Specific examples of the acyl phosphine oxide based compound are given below [Illustrative Compounds (P-1) to (P-26)], but it should not be construed that the present invention is limited thereto.

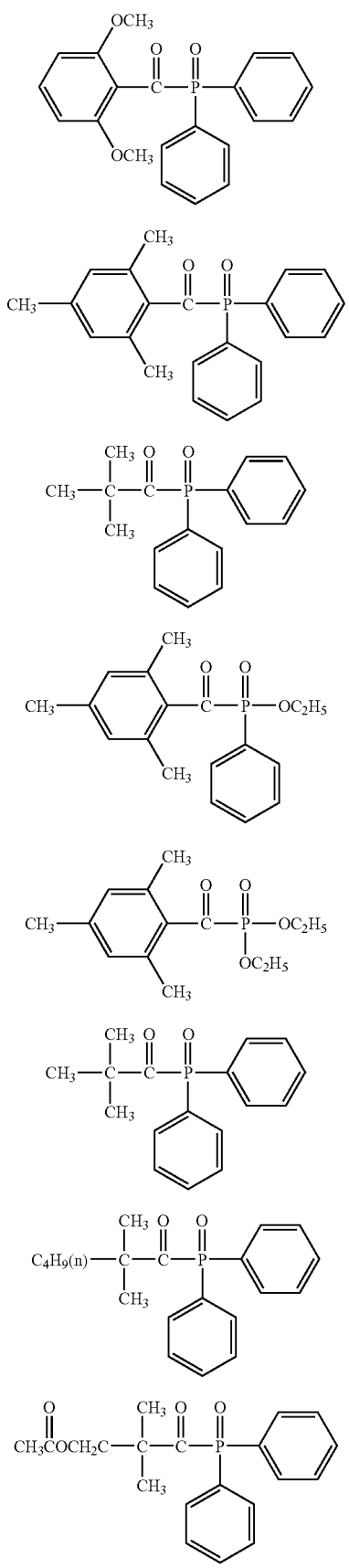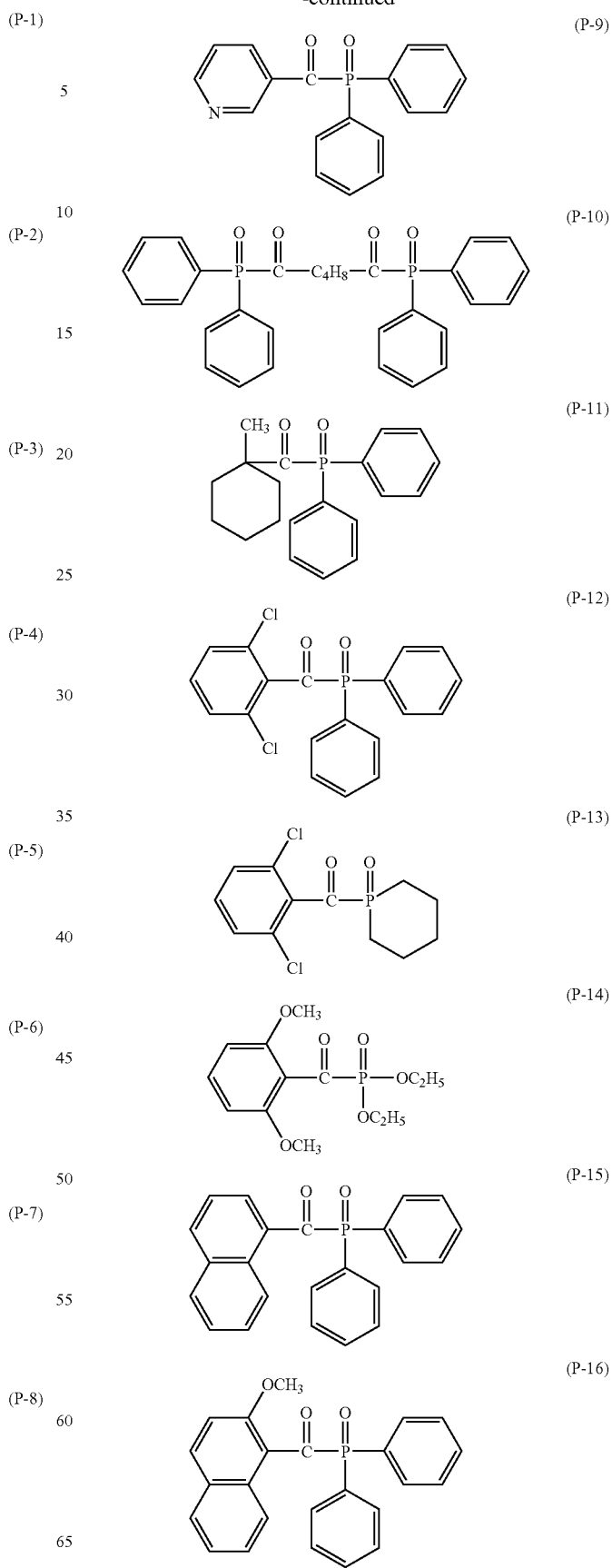

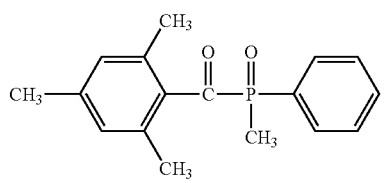
(P-17)

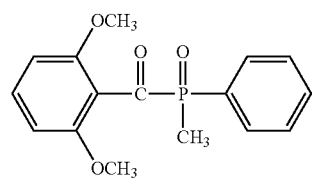
(P-18)

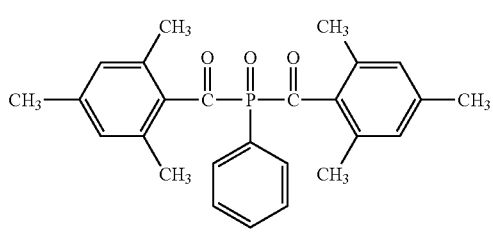
(P-19)

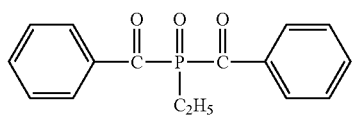
(P-20)

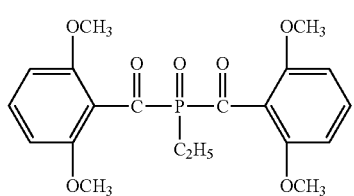
(P-21)

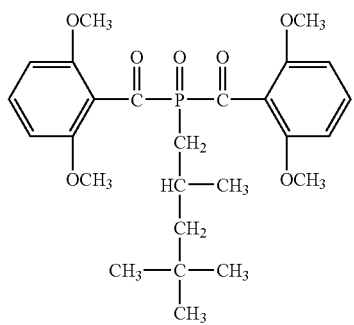
(P-22)

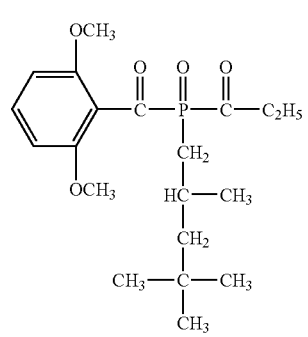
(P-23)

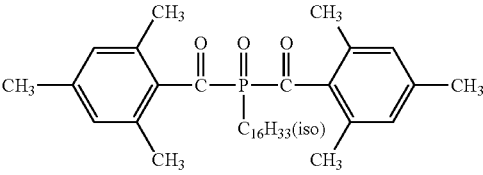
(P-24)

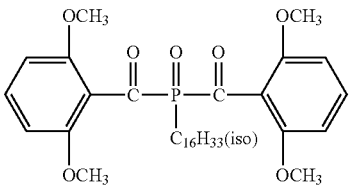
(P-25)

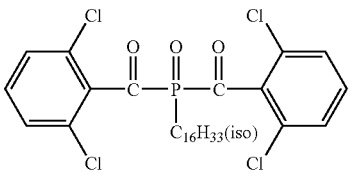
(P-26)

Among the foregoing Illustrative Compounds, for example, (P-2) [2,4,6-trimethylbenzoyl-diphenyl-phosphine oxide] is available as a trade name of DAROCUR TPO (manufactured by Ciba Specialty Chemicals); and (P-19) [bis (2,4,6-trimethyl-benzoyl)-phenylphosphine oxide] is available as a trade name of IRGACURE 819 (manufactured by Ciba Specialty Chemicals).

The content of the foregoing specified polymerization initiator in the ink composition of the present invention is preferably in the range of from 0.1 to 30% by mass, and more preferably in the range of from 0.2 to 20% by mass as expressed in terms of a solid content.

[Other Polymerization Initiator]

The ink composition of the present invention is required to contain at least the foregoing specified polymerization initiator as the photopolymerization initiator. However, other photopolymerization initiator may be used jointly so far as the effects of the present invention are not impaired.

Examples of known polymerization initiators which can be used jointly include camphor quinone; benzophenone; benzophenone derivatives; acetophenone; acetophenone derivatives, for example, α-hydroxycycloalkylphenyl ketones or 2-hydroxy-2-methyl-1-phenyl-propanone; dialkoxyacetophenones; α-hydroxy- or 4-aroyl-1,3-dioxolanes; benzoin alkyl ethers and benzyl ketals, for example, benzyl dimethyl ketal; phenyl glyoxalate and derivatives thereof; phenyl glyoxalate dimer; peresters, for example, benzophenone tetracarboxylic acid peresters (for example, those described in EP No. 1,126,541); halomethyl triazines, for example, 2-[2-(4-methoxy-phenyl)-vinyl]-4,6-bis-trichloromethyl[1,3,5]triazine, 2-(4-methoxy-phenyl)-4,6-bis-trichloromethyl[1,3,5] triazine, 2-(3,4-dimethoxy-phenyl)-4,6-bis-trichloromethyl [1,3,5]triazine and 2-methyl-4,6-bis-trichloromethyl[1,3,5] triazine; hexaaryl bisimidazole/combination initiator systems, for example, o-chlorohexaphenyl-bisimidazole combined with 2-mercaptobenzothiazole; ferrocenium compounds or titanocenes, for example, dicyclopentadienyl-bis (2,6-difluoro-3-pyrro-phenyl)titanium; and mixtures with an O-acyloxy ester compound as described in, for example, GB No. 2,339,571. A boric acid compound can also be used as the combination initiator.

The content of the polymerization initiator in the ink composition of the present invention is preferably in the range of from 0.01 to 35 parts by mass, more preferably from 0.1 to 30 parts by mass, and further preferably from 0.5 to 30 parts by mass based on 100 parts by mass of (iii) an ethylenically unsaturated bond-containing polymerizable compound as described later. The content of the polymerization initiator as referred to herein means a total content of the polymerization initiator including the specified polymerization initiators and other polymerization initiator which can be used jointly.

(iii) Ethylenically Unsaturated Bond-Containing Polymerizable Compound

The ink composition of the present invention contains a polymerizable compound. The polymerizable compound which can be suitably used in the present invention is a radical polymerizable, ethylenically unsaturated bond-containing compound and may be any compound so far as it has at least one radical polymerizable, ethylenically unsaturated bond in a molecule thereof. Examples thereof include compounds having a chemical morphology, for example, a monomer, an oligomer and a polymer.

The radical polymerizable compound may be used singly, or two or more kinds of radical polymerizable compounds may be used jointly in an arbitrary ratio for the purpose of enhancing the desired characteristics. It is preferable that two or more kinds of radical polymerizable compounds are used jointly in view of controlling performances, for example, reactivity and physical properties.

Examples of the ethylenically unsaturated double bond-containing polymerizable compound include unsaturated carboxylic acids (for example, acrylic acid, methacrylic acid, itaconic acid, crotonic acid, isocrotonic acid and maleic acid) and salts thereof; ethylenically unsaturated bond-containing anhydrides; acrylonitrile; styrene; and various radical polymerizable compounds (for example, unsaturated polyesters, unsaturated polyethers, unsaturated polyamides and unsaturated urethanes).

Specific examples thereof include acrylic acid derivatives (for example, 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide and epoxy acrylate); methacrylic acid derivatives (for example, methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate and 2,2-bis(4-methacryloxypolyethoxyphenyl)propane; and besides, allyl compound derivatives (for example, allyl glycidyl ether, diallyl phthalate and triallyl trimellitate).

More concretely, radical polymerizable and crosslinking monomers, oligomers and polymers which are commercially available or known in the art, as described in, for example, *Crosslinking Agent Handbook*, edited by Shinzo YAMASHITA and published by Taiseisha Ltd. (1981); *UV or EB Curing Handbook* (*Raw Material Volume*), edited by Kiyoshi KATO and published by Kobunshi Kankokai (1985); and *Application and Market of UV or EB Curing Technology*, edited by RadTech Japan and published by CMC Publishing Co., Ltd., page 79 (1989); and *Polyester Resin Handbook*, written by Eiichiro TAKIYAMA and published by The Nikkan Kogyo Shimbun, Ltd. (1988) can be used.

Examples of the radical polymerizable compound include photocuring type polymerizable compounds which are used for a photopolymerizable composition as described in, for example, JP-A No. 7-159983, JP-B No. 7-31399 and JP-A Nos. 8-224982, 10-863 and 9-134011.

For the purpose of more improving the sensitivity, bleeding and adhesion to a recording medium, it is preferable that a monoacrylate and a polyfunctional acrylate monomer or a polyfunctional acrylate oligomer having a molecular weight of 400 or more, and preferably 500 or more are used jointly. In particular, in an ink composition to be used for recording on a flexible medium to be recorded, for example, a PET film or a PP film, the joint use of the monoacrylate selected from the foregoing compound group and the polyfunctional acrylate monomer or polyfunctional acrylate oligomer is preferable because not only flexibility is imparted to a film, but the film strength is enhanced while enhancing the adhesion.

Furthermore, an embodiment in which at least three kinds of polymerizable compounds of monofunctional, bifunctional and trifunctional or polyfunctional monomers are used jointly is preferable from the viewpoints that the sensitivity, bleeding and adhesion to a medium to be recorded can be more improved while maintaining the safety.

Among the monoacrylates, stearyl acrylate, isoamyl acrylate, isomyristyl acrylate and isostearyl acrylate have high sensitivity and low shrinking properties, thereby preventing the generation of curl. Also, these compounds are preferable in view of prevention of bleeding, odors of a printed matter and cost reduction of an irradiation unit.

As the oligomer which can be used jointly with the monoacrylate, an epoxy acrylate oligomer and a urethane acrylate oligomer are especially preferable.

The methacrylate has lower skin irritation than the acrylate.

Among the foregoing compounds, the case where an alkoxy acrylate is used in an amount of less than 70% by mass, with the remaining being an acrylate is preferable because good sensitivity, bleeding characteristic and odor characteristic are brought.

Though the ink composition of the present invention contains the foregoing (i) to (iii) components as essential components, known other components can be used jointly as additives of the ink composition depending upon the purpose. These arbitrary components are hereunder described.

<Coloring Agent>

In the case where the ink composition of the present invention is applied for utilities such as the formation of an image part of a lithographic printing plate, it is not essential to form a colored image. In such a utility of the ink, a coloring agent is not specifically required. For the purpose of enhancing the visibility of an image part formed by an ink composition, or when it is intended to form a colored image by using an ink composition, the ink composition can contain a coloring agent.

Though the coloring agent which can be used in the present invention is not particularly limited, (1) a pigment and (2) an oil-soluble dye, each of which is excellent in weatherability and rich in color reproducibility, are preferable and can be selected and used among arbitrary known coloring agents such as soluble dyes. From the viewpoint of reducing the sensitivity of the curing reaction due to active radiation rays, it is preferable that a compound which does not function as a polymerization inhibitor in a polymerization reaction which is the curing reaction is selected as the coloring agent which can be suitably used in the ink composition or inkjet recording ink composition of the present invention.

(1) Pigment:

The pigment which can be used in the present invention is not particularly limited, and examples thereof include organic or inorganic pigments with the following numbers as described in the color index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226 and 257; Pigment Violet 3, 19, 23, 29, 30, 37, 50 and 88; and Pigment Orange 13, 16, 20 and 36.

Examples of blue or cyan pigments include Pigment Blue 1, 15, 15:1, 15:2, 15:3, 15:4, 15:6, 16, 17-1, 22, 27, 28, 29, 36 and 60.

Examples of green pigments include Pigment Green 7, 26, 36 and 50.

Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185 and 193.

Examples of black pigments include Pigment Black 7, 28 and 26.

Examples of white pigments include Pigment White 6, 18 and 21.

These pigments are properly selected and used depending upon the purpose.

(2) Oil-Soluble Dye:

The oil-soluble dye which can be used in the present invention is hereunder described.

The oil-soluble dye which can be used in the present invention means a dye which is substantially insoluble in water. Concretely, the oil-soluble dye refers to a dye having a solubility in water (mass of the dye which can be dissolved in 100 g of water) at 25° C. of not more than 1 g, preferably not more than 0.5 g, and more preferably not more than 0.1 g. Accordingly, the oil-soluble dye as referred to in the present invention means a so-called water-insoluble pigment or oil-soluble coloring matter. Of these, an oil-soluble coloring matter is preferable.

Among the oil-soluble dyes which can be used in the present invention, arbitrary yellow dyes can be used. Examples thereof include aryl or heteryl azo dyes having, for example, phenols, naphthols, anilines, pyrazolones, pyridones or open-chain active methylene compounds as a coupling component; azomethine dyes having, for example, open-chain active methylene compounds as a coupling component; methine dyes, for example, benzylidene dyes and monomethine oxonol dyes; and quinone dyes, for example, naphthoquinone dyes and anthraquinone dyes. Examples of other dye species include quinophthalone dyes, nitro-nitroso dyes, acridine dyes and acridinone dyes.

Among the oil-soluble dyes which can be used in the present invention, arbitrary magenta dyes can be used. Examples thereof include aryl or heteryl azo dyes having, for example, phenols, naphthols or anilines as a coupling component; azomethine dyes having, for example, pyrazolones or pyrazolotriazoles as a coupling component; methine dyes, for example, arylidene dyes, styryl dyes, merocyanine dyes and oxonol dyes; carbonium dyes, for example, diphenylmethane dyes, triphenylmethane dyes and xanthene dyes; quinone based dyes, for example, naphthoqinone, anthraquinone and anthrapyridone; and fused polycyclic dyes, for example, dioxazine dyes.

Among the oil-soluble dyes which can be applied in the present invention, arbitrary cyan dyes can be used. Examples thereof include indoaniline dyes, indophenol dyes or azomethine dyes having, for example, pyrrolotriazole dyes as a coupling component; polymethine dyes, for example, cyanine dyes, oxonol dyes and merocyanine dyes; carbonium dyes, for example, diphenylmethane dyes, triphenylmethane dyes and xanthene dyes; phthalocyanine dyes; anthraquinone dyes; aryl or heteryl azo dyes having, for example, phenols, naphthols or anilines as a coupling component; and indigothioindigo dyes.

Each of the foregoing dyes may be one which shows a color (for example, yellow, magenta and cyan color) first when a part of its chromophore (color developable atomic group) is dissociated. In that case, a counter cation thereof may be either an inorganic cation such as an alkali metal and ammonium or an organic cation such as pyridinium and a quaternary ammonium salt. It may also be a polymer cation having the same in a structure thereof.

Specific examples of the preferred oil-soluble dye are given below, but it should not be construed that the present invention is limited thereto.

C.I. Solvent Black 3, 7, 27, 29 and 34;
C.I. Solvent Yellow 14, 16, 19, 29, 30, 56, 82, 93 and 162;
C.I. Solvent Red 1, 3, 8, 18, 24, 27, 43, 49, 51, 72, 73, 109, 122, 132 and 218;
C.I. Solvent Violet 3;
C.I. Solvent Blue 2, 11, 25, 35, 38, 67 and 70;
C.I. Solvent Green 3 and 7; and
C.I. Solvent Orange 2.

Among them, for example, Nubian Black PC-0850, Oil Black HBB, Oil Yellow 129, Oil Yellow 105, Oil Pink 312, Oil Red 5B, Oil Scarlet 308, Vali Fast Blue 2606 and Oil Blue BOS (all of which are manufactured by Orient Chemical Industries, Ltd.); Aizen Spilon Blue GNH (manufactured by Hodogaya Chemical Co., Ltd.); and Neopen Yellow 075, Neopen Mazenta SE1378, Neopen Blue 808, Neopen Blue FF4012 and Neopen Cyan FF4238 (all of which are manufactured by BASF AG) are especially preferable.

In the present invention, the oil-soluble dye may be used singly or in admixture of several kinds thereof.

Also, when the oil-soluble dye is used as the coloring agent, for example, other water-soluble dyes, disperse dyes and pigments can be used jointly as the need arises so far as the effects of the present invention are not impaired.

(3) Disperse Dye:

Also, in the present invention, a disperse dye can be used within the range where it is soluble in a water-immiscible organic solvent. In general, though the disperse dye includes a water-soluble dye, in the present invention, it is preferable that the disperse dye is used within the range where it is soluble in a water-immiscible organic solvent.

Specific examples of the preferred disperse dye are given below.

C.I. Disperse Yellow 5, 42, 54, 64, 79, 82, 83, 93, 99, 100, 119, 122, 124, 126, 160, 184:1, 186, 198, 199, 201, 204, 224 and 237;

C.I. Disperse Orange 13, 29, 31:1, 33, 49, 54, 55, 66, 73, 118, 119 and 163;

C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362;

C.I. Disperse Violet 33;

C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

It is preferable that the coloring agent which can be used in the present invention is added in the ink composition or inkjet recording ink composition of the present invention and then appropriately dispersed in the subject ink. For dispersing the coloring agent, various dispersing devices, for example, a ball mill, a sand mill, an attritor, a roll mill, an agitator, a Henschel mixer, a colloid mill, an ultrasonic homogenizer, a pearl mill, a wet type jet mill and a paint shaker.

It is also possible to add a dispersant during dispersing the coloring agent. Though the kind of the dispersant is not particularly limited, it is preferred to use a high-molecular weight dispersant. Examples of the high-molecular weight dispersant include Zeneca's SOLSPERSE Series. It is also possible to use a synergist as a dispersing agent depending on the pigment of every kind. In the present invention, these dispersant and dispersing agent are preferably added in an amount of from 1 to 50 parts by mass based on 100 parts by mass of the coloring agent.

The coloring agent may be blended through direction addition together with the respective components during the preparation of the ink composition of the present invention. For the purpose of enhancing the dispersibility, the coloring agent can also be previously added in a solvent, a specified monofunctional (meth)acrylic acid derivative in the present invention or a dispersion medium such as other polymerizable compounds, which is used jointly if desired, and then can be uniformly dispersed or dissolved the mixture to be blended thereto.

In the present invention, for the purpose of avoiding a reduction with time of solvent resistance of the image part, which is feared when the solvent remains in the cured image, and a problem of VOC (volatile organic compound) of the residual solvent, it is preferable that the coloring agent is blended after adding in any one of polymerizable compounds including the specified monofunctional (meth)acrylic acid derivative or a mixture thereof in advance. Taking into consideration only the viewpoint of dispersion suitability, it is preferred to select a monomer having the lowest viscosity as the polymerizable compound to be used for the addition of the coloring agent.

The coloring agent may be properly selected and used singly or in combination of two or more thereof depending upon the use purpose of the ink composition.

In the ink composition of the present invention, when the coloring agent such as a pigment which exists in a state of solid as it is, it is suitable to select the coloring agent, dispersant and dispersion medium and to set up the dispersing condition and filtering condition such that an average particle size of the coloring agent particle is preferably from 0.005 µm to 0.5 µm, more preferably from 0.01 µm to 0.45 µm, and further preferably from 0.015 µm to 0.4 µm. This particle size control is preferable because clogging of a nozzle can be suppressed, and the storage stability of the ink and the ink transparency and curing sensitivity can be maintained.

The content of the coloring agent in the ink composition of the present invention is properly selected depending upon the use purpose. Taking into consideration of the ink physical properties and coloring properties, in general, the content of the coloring agent is preferably from 1 to 10% by mass, and more preferably from 2 to 8% by mass relative to the mass of the whole of the ink composition.

<Other Components>

Other components can be added in the ink composition of the present invention as the need arises. Examples of other components include a polymerization inhibitor and a solvent.

The polymerization inhibitor can be added from the viewpoint of enhancing the storage stability. When the ink composition of the present invention is used as an inkjet recording ink composition, it is preferable that the ink composition is made low in viscosity by heating at a temperature ranging from 40 to 80° C. and then discharged; and for the purpose of preventing from head clogging to be caused due to the thermal polymerization, it is preferred to add the polymerization inhibitor.

The polymerization inhibitor is preferably added in an amount of from 200 to 20,000 ppm relative to the whole amount of the ink composition of the present invention. Examples of the polymerization inhibitor include hydroquinone, benzoquinone, p-methoxyphenol, TEMPO, TEMPOL and cupferron A1.

In view of the matter that the ink composition or inkjet recording ink composition of the present invention is a radiation curable ink composition, it is preferable that the ink composition does not contain a solvent such that it is able to rapidly react and cure immediately after impacting. But, the ink composition can contain a prescribed solvent so far as the curing rate of the ink composition or the like is not adversely affected. In the present invention, an organic solvent or water can be used as the solvent. In particular, the organic solvent can be added for the purpose of improving the adhesion to a medium to be recorded (for example, a support such as paper). The addition of the organic solvent is effective because the problem of VOC can be avoided.

The amount of the organic solvent is, for example, in the range of from 0.1 to 5% by mass, and preferably from 0.1 to 3% by mass relative to the mass of the whole of the ink composition of the present invention.

Besides, a known compound can be added in the ink composition of the present invention as the need arises. For example, a surfactant; a leveling additive; a matting agent; a polyester based resin, a polyurethane based resin, a vinyl based resin, an acrylic resin, a rubber based resin and a wax for adjusting the film physical properties; and the like can be properly selected and added. Also, for the purpose of improving the adhesion to a medium to be recorded, for example, polyolefins and PET, a tackifier which does not impair the polymerization can be contained. Specific examples thereof include high-molecular weight adhesive polymers as described on pages 5 to 6 of JP-A No. 2001-49200 (for example, copolymers composed of an ester of (meth)acrylic acid and an alcohol containing an alkyl group having from 1 to 20 carbon atoms, an ester of (meth)acrylic acid and an alicyclic alcohol having from 3 to 14 carbon atoms or an ester of (meth)acrylic acid and an aromatic alcohol having from 6 to 14 carbon atoms); and polymerizable unsaturated bond-containing low-molecular weight tackiness imparting resins.

—Properties of Ink Composition—

As described previously, the ink composition of the present invention is required to contain a polymerization initiator and a specified monofunctional (meth)acrylic acid derivative and furthermore, contains other polymerizable compound, a coloring agent and the like as arbitrary components.

The content of the coloring agent is preferably from 1 to 10% by mass, and more preferably from 2 to 8% by mass relative to the mass of the whole of the ink composition. The content of the whole of the polymerizable compounds including an acidic group-containing monofunctional (meth)acrylic acid derivative or a basic group-containing monofunctional (met)acrylic acid derivative is preferably from 5 to 97% by mass, and more preferably from 30 to 95% by mass relative to the mass of the whole of the ink composition. It is suitable that the polymerization initiator is contained in an amount of preferably from 0.01 to 35% by mass, more preferably from 0.1 to 30% by mass, and further preferably from 0.5 to 30% by mass relative to the whole of the polymerizable compounds including a specified monofunctional (meth)acrylic acid derivative.

The ink composition of the present invention can be suitably used as an inkjet recording ink. Preferred physical properties in an embodiment for use as an inkjet recording ink are hereunder described.

When the ink composition is used as an inkjet recording ink, taking into consideration discharge properties, its viscosity is preferably from 7 to 30 mPa·s, and more preferably from 7 to 25 mPa·s at a temperature at the discharge (for example, from 40 to 80° C., and preferably from 25 to 50° C.). For example, the viscosity of the ink composition of the present invention at room temperature (from 25 to 30° C.) is preferably from 35 to 500 mPa·s, and more preferably from 35 to 200 mPa·s.

It is preferable that the composition ratio of the ink composition of the present invention is properly adjusted such that the viscosity falls within the foregoing range. By setting up the viscosity at room temperature high, even when a porous medium to be recorded is used, it is possible to avoid the penetration of the ink into the medium to be recorded, to reduce the uncured monomer and to reduce the odor. Furthermore, the bleeding of the ink at the impacting of ink droplets can be suppressed, resulting in improving the image quality.

A surface tension of the ink composition of the present invention is preferably from 20 to 30 mN/m, and more preferably from 23 to 28 mN/m. In the case of achieving recording on various media to be recorded, for example, polyolefins, PET, coat paper and non-coat paper, the surface tension is preferably 20 mN/m or more from the viewpoints of bleeding and penetration and not more than 30 mN/m from the viewpoint of wettability.

[Inkjet Recording Method]

Next, the inkjet recording method of the present invention and an inkjet recording apparatus which can be applied to the subject method are described.

The inkjet recording method of the present invention is a method in which the foregoing ink composition of the present invention is discharged onto a medium to be recorded for inkjet recording (for example, a support and a material to be recorded), and then active radiation rays are irradiated on the ink composition having been discharged onto the medium to be recorded, thereby curing the ink to form an image.

That is, the inkjet recording method of the present invention comprises (a) a process of discharging the ink composition of the present invention onto a medium to be recorded; and (b) a process of irradiating the discharged ink composition with active radiation rays to cure the ink composition.

When the inkjet recording method of the present invention includes the foregoing processes (a) and (b), an image is formed by the ink composition having been cured on the medium to be recorded.

In the process (a) in the inkjet recording method of the present invention, an inkjet recording apparatus as described below in detail can be used.

<Inkjet Recording Apparatus>

The inkjet recording apparatus which is used for the recording method of the present invention is not particularly limited, and a known inkjet recording apparatus capable of achieving a target resolution can be arbitrarily selected and used. That is, all of known inkjet recording apparatus including commercial products are able to perform the ink discharge onto the medium to be recorded in the process (a) of the inkjet recording method of the present invention.

Examples of the inkjet recording apparatus which can be used in the present invention include an apparatus including an ink feed system, a temperature sensor and an active radiation ray source.

The ink feed system is composed of, for example, a source tank containing the ink composition of the present invention, a feed pipe, an ink feed tank just before an inkjet head, a filter and a piezo-type inkjet head. The piezo-type inkjet head can be driven such that a multi-size dot of from 1 to 100 pl, and preferably from 8 to 30 pl can be discharged with a resolution of from 320×320 to 4,000×4,000 dpi, preferably from 400×400 to 1,600×1,600 dpi, and more preferably 720×720 dpi. The term "dpi" as referred to in the present invention expresses a dot number per 2.54 cm.

As described previously, in the radiation curable ink, since the ink to be discharged is desired to be kept at a constant temperature, it is possible to perform thermal insulation and heating from the ink feed tank to the inkjet head portion. A method for controlling the temperature is not particularly limited. For example, a method in which plural temperature sensors are provided in the respective pipe sites and the heating is controlled corresponding to the ink flow rate and the circumferential temperature is preferable. The temperature sensor can be provided in the ink feed tank and in the vicinity of a nozzle of the inkjet head. It is preferable that the head unit to be heated is thermally blocked or insulated such that the apparatus main body is not influenced by the temperature of the outside air. For the purpose of shortening the rise-up time of a printer required for heating or reducing a loss of thermal energy, it is preferable that not only the thermal insulation from other sites is performed, but the thermal capacity of the whole of the heating unit is made small.

Next, the process (b) for irradiating the discharged ink composition with active radiation rays to cure the ink composition is described.

The ink composition having been discharged on a medium to be recorded is cured upon irradiation with active radiation rays. This is because the polymerization initiator contained in the ink composition of the present invention is decomposed upon irradiation with active radiation rays to generate an initiation species such as a radical, an acid and a base; and a polymerization reaction of the specified monofunctional (meth)acrylic acid derivative or other polymerizable compound to be used jointly if desired is caused and promoted, whereby the ink composition is cured. At that time, when the sensitizing dye exists together with the polymerization initiator in the ink composition, the sensitizing dye in the system absorbs active radiation rays to become in an excited state and then comes into contact with the polymerization initiator to promote the decomposition of the polymerization initiator, thereby achieving a curing reaction with higher sensitivity.

Examples the active radiation rays which can be used herein include α-rays, γ-rays, X-rays, electron beams, ultraviolet rays, visible light and infrared rays. Though a peak wavelength of the active radial rays varies with the absorption characteristic of the sensitizing dye, for example, it is preferably from 200 to 600 nm, more preferably from 300 to 450 nm, and further preferably from 350 to 420 nm.

Also, in the present invention, the polymerization initiation system has sufficient sensitivity even to active radiation rays with a low output. Accordingly, the output of the active radiation rays is preferably not more than 2,000 mJ/cm$^2$, more preferably from 10 to 2,000 mJ/cm$^2$, further preferably from 20 to 1,000 mJ/cm$^2$, and especially preferably from 50 to 800 mJ/cm$^2$.

Also, it is suitable that the active radiation rays are irradiated at an illuminance on an exposed surface of, for example, from 10 to 2,000 mW/cm$^2$, and preferably from 20 to 1,000 mW/cm$^2$.

As an active radical ray source, a mercury vapor lamp, a gas or solid laser and the like can be utilized. As a light source which is used for curing of an ultraviolet ray curable inkjet recording ink, a mercury vapor lamp and a metal halide lamp are widely known. However, at present, from the viewpoint of environmental protection, it is eagerly desired that mercury is not used. Replacement with a GaN based semiconductor ultraviolet light-emitting device is very useful industrially and environmentally. Furthermore, LED (UV-LED) and LD (UV-LD) are small in size, high in life span, high in efficiency and low in cost and are expected as a photocurable inkjet light source.

Also, it is possible to use a light-emitting diode (LED) and a laser diode (LD) as the active radial ray source. In particular, when an ultraviolet ray source is required, an ultraviolet LED and an ultraviolet LD can be used. For example, Nichia Corporation places an ultraviolet LED, whose main emission spectrum has a wavelength ranging from 365 nm to 420 μm, on the market. In the case where a much shorter wavelength is required, U.S. Pat. No. 6,084,250 discloses an LED capable of emitting active radiation rays, which is centered in the range of from 300 nm to 370 nm. Also, other ultraviolet LED is available and is able to irradiate radiations of a different ultraviolet ray band. In the present invention, an UV-LED is especially preferable as the active radiation ray source. An UV-LED having a peak wavelength of from 350 nm to 420 nm is especially preferable.

Also, the maximum illuminance of LED on a medium to be recorded is preferably from 10 to 2,000 mW/cm$^2$, more preferably from 20 to 1,000 mW/cm$^2$, and especially preferably from 50 to 800 mW/cm$^2$.

It is suitable that the ink composition of the present invention is irradiated with such active radiation rays for, for example, from 0.01 to 120 seconds, and preferably from 0.1 to 90 seconds.

Irradiation condition and basic irradiation method of active radiation rays are disclosed in JP-A No. 60-132767. Concretely, the irradiation is carried out by providing a light source on both sides of a head unit including an ink discharge device and scanning the head unit and the light source in a so-called shuttle mode. The irradiation of active radiation rays is carried out by leaving a fixed time (for example, from 0.01 to 0.5 seconds, preferably from 0.01 to 0.3 seconds, and more preferably from 0.01 to 0.15 seconds) after impacting of the ink. In this way, by controlling the time of from impacting of the ink to irradiation at an extremely short time, it becomes possible to prevent bleeding of the ink having been impacted onto the medium to be recorded prior to curing. Also, when even a porous medium to be recorded is used, the ink can be exposed before the ink penetrates to a deep part where the light source does not reach, therefore, the retention of the unreacted monomer can be suppressed, resulting in reducing an odor.

Furthermore, the curing may be accomplished by a separate light source which is not accompanied with driving. WO 99/54415 discloses, as an irradiation method, a method of using optical fibers and a method of exposing a collimated light source to a mirror surface provided on the surface of the head unit side and irradiating a recording part with UV rays. Such a curing method is also applicable to the recording method of the present invention.

By employing the foregoing inkjet recording method, a dot size of the impacted ink can be kept constant even for various media to be recorded having different surface wettability, thereby enhancing the image quality. In order to obtain a color image, it is preferred to superimpose colors successively in the order from a color with low brightness. By superposing inks successively in the order from an ink with low brightness, irradiated rays are liable to reach even an ink of the lower part, whereby good curing sensitivity, reduction of the residual monomer, reduction of an odor and enhancement of adhesion can be expected. Also, with respect to the irradiation, though the exposure can be collectively performed by discharging all colors, from the viewpoint of promoting the curing, it is preferable that the exposure is performed for every color.

In this way, the ink composition of the present invention is cured with high sensitivity upon irradiation with active radiation rays, thereby forming a hydrophobic image on a surface of a medium to be recorded.

Here, the active radiation ray source to be used for curing the ink or its preferred irradiation condition is also the same as that mentioned in the inkjet recording method.

The ink composition of the present invention is cured with high sensitivity upon irradiation with active radiation rays, thereby enabling one to form a hydrophobic region which is excellent in adhesion to the support and film quality. For that reason, in addition to the formation of a colored image or marking or the like, for example, the ink composition of the present invention can also be used for the formation of an image part of a lithographic printing plate. By applying the ink composition of the present invention to this utility, it is also possible to obtain a lithographic printing plate having high image quality and excellent printing resistance.

Needless to say, for the foregoing reasons, while the ink composition of the present invention is excellent for inkjet recording, it is also useful as a generally used ink composition.

EXAMPLES

The present invention is more specifically described below with reference to the following Examples, but it should not be construed that the present invention is limited to these Examples. The following Examples are concerned with a UV inkjet ink of each color. All parts are a part by mass unless otherwise indicated.

Example 1

The following components were stirred by a high-speed water-cooling stirring apparatus to obtain a UV inkjet ink of white color.

(White Ink Composition)

| | |
|---|---|
| LIGHT ACRYLATE L-A [lauryl acrylate: monofunctional acrylate]: | 17.4 parts |
| ACTILANE 421 (acrylate monomer, manufactured by Akcros Chemicals) | 25.0 parts |

-continued

| | |
|---|---|
| [propoxylated neopentyl glycol diacrylate: bifunctional acrylate]: | |
| PHOTOMER 2017 (UV diluent, manufactured by EChem): | 15.0 parts |
| SOLSPERSE 36000 (dispersant, manufactured by Noveon, Inc.): | 2.0 parts |
| MICROLITH WHITE R-A | 15.0 parts |
| (pigment, manufactured by Ciba Specialty Chemicals): | |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-4 (having the following structure)]: | 4.0 parts |
| DAROCUR TPO [specified polymerization initiator (P-2)] | 8.5 parts |
| (photopolymerization initiator, manufactured by Ciba Specialty Chemicals): | |
| IRGACURE 907 [specified polymerization initiator] | 4.0 parts |
| (photopolymerization initiator, manufactured by Ciba Specialty Chemicals): | |
| BYK 307 (defoaming agent, manufactured by BYK Chemie GmbH): | 0.05 parts |

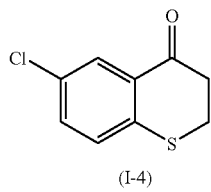

(I-4)

<Evaluation of Ink>

The obtained white ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$), to obtain a printed matter.

At that time, the following evaluation was carried out.

—Sensitivity—

The exposure energy at the time of curing was measured by a light quantity accumulation meter (UV Power MAP, manufactured by EIT Inc.). As a result, the integrated light exposure quantity of ultraviolet rays on the sheet was about 330 mJ/cm$^2$, and it was confirmed that the ink was cured with high sensitivity.

—Curing Properties—

Curing properties were determined by observing the surface stickiness of the printed matter when plain paper (C2 paper; manufactured by Fuji Xerox Co., Ltd.) was pressed onto the printed matter immediately after printing. Evaluation criteria are as follows.

Favorable: Transfer of colorant liquid to the plain paper did not occur.

Poor: Transfer of colorant liquid to the plain paper occurred.

—Discharge Stability—

After storing the obtained white ink composition at room temperature for four weeks, recording was carried out on a medium to be recorded by using a commercially available inkjet recording apparatus having piezo-type inkjet nozzles, and continuous printing was carried out at room temperature for 48 hours. The presence or absence of dot deletion and spattering of the ink was visually observed and evaluated according to the following criteria. The obtained results are shown in Table 1.

A: Dot deletion or spattering of the ink did not occur or occurred not more than 3 times.

B: Dot deletion or spattering of the ink occurred 4 times to 10 times.

C: Dot deletion or spattering of the ink occurred 11 times or more.

At that time, the formed image developed a good white color.

The ink feed system of the inkjet recording apparatus used for the evaluation is composed of a source tank, a feed pipe, an ink feed tank just before an inkjet head, a filter and a piezo-type inkjet head.

Thermal insulation and heating were carried out from the ink feed tank to the inkjet head. Temperature sensors were provided in the ink feed tank and in the vicinity of the nozzle of the inkjet head, respectively, and the temperature was controlled such that the temperature of the nozzle portion was always 40° C.±2° C.

The piezo-type inkjet head was driven such that multi-size dots of from 8 to 30 pl could be discharged with a resolution of 720×720 dpi. The term "dpi" as referred to in the present invention expresses a dot number per 2.54 cm.

Example 2

The following components were stirred by a high-speed water-cooling stirring apparatus to obtain a UV inkjet ink of cyan color.

(Cyan Ink Composition)

| | |
|---|---|
| LIGHT ACRYLATE L-A: | 21.4 parts |
| ACTILANE 421 (acrylate monomer, manufactured by Akcros Chemicals): | 30.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| IRGALITE BLUE GLVO (pigment, manufactured by Ciba Specialty Chemicals): | 3.6 parts |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-4 (having the foregoing structure)]: | 4.0 parts |
| DAROCUR TPO | 8.5 parts |

| | |
|---|---|
| (photopolymerization initiator, manufactured by Ciba Specialty Chemicals): | |
| IRGACURE 907 [specified polymerization initiator] | 4.0 parts |
| (photopolymerization initiator, manufactured by Ciba Specialty Chemicals): | |
| BYK 307 (defoaming agent, manufactured by BYK Chemie GmbH): | 0.05 parts |

<Evaluation of Ink>

The thus prepared cyan ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

Example 3

The following components were stirred by a high-speed water-cooling stirring apparatus to obtain a UV inkjet ink of magenta color.

(Magenta Ink Composition)

| | |
|---|---|
| LIGHT ACRYLATE L-A: | 15.4 parts |
| ACTILANE 421 (acrylate monomer, manufactured by Akcros Chemicals): | 36.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| CINQUASIA MAZENTA RT-355D | 3.6 parts |
| (pigment, manufactured by Ciba Specialty Chemicals): | |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-4 (having the foregoing structure)]: | 4.0 parts |
| DAROCUR TPO | 8.5 parts |
| (photopolymerization initiator, manufactured by Ciba Specialty Chemicals): | |
| IRGACURE 907 [specified polymerization initiator] | 4.0 parts |
| (photopolymerization initiator, manufactured by Ciba Specialty Chemicals): | |
| BYK 307 (defoaming agent, manufactured by BYK Chemie GmbH): | 0.05 parts |

<Evaluation of Ink>

The thus prepared magenta ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

Example 4

The following components were stirred by a high-speed water-cooling stirring apparatus to obtain a UV inkjet ink of yellow color.

(Yellow Ink Composition)

| | |
|---|---|
| LIGHT ACRYLATE L-A: | 10.0 parts |
| ACTILANE 421 (acrylate monomer, manufactured by Akcros Chemicals): | 45.4 parts |
| PHOTOMER 2017 (UV diluent, manufactured by EChem): | 20.0 parts |
| SOLSPERSE 32000 (dispersant, manufactured by Noveon, Inc.): | 0.4 parts |
| CROMOPHTAL YELLOW LA | 3.6 parts |
| (pigment, manufactured by Ciba Specialty Chemicals): | |
| GENORAD 16 (stabilizer, manufactured by Rahn AG): | 0.05 parts |
| RAPI-CURE DVE-3 (vinyl ether, manufactured by ISP Europe): | 4.0 parts |
| Specified sensitizing dye [Compound I-4 (having the foregoing structure)]: | 4.0 parts |
| DAROCUR TPO | 8.5 parts |
| (photopolymerization initiator, manufactured by Ciba Specialty Chemicals): | |
| IRGACURE 907 [specified polymerization initiator] | 4.0 parts |
| (photopolymerization initiator, manufactured by Ciba Specialty Chemicals): | |
| BYK 307 (defoaming agent, manufactured by BYK Chemie GmbH): | 0.05 parts |

<Evaluation of Ink>

The thus prepared yellow ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

Example 5

The following components were stirred by a high-speed water-cooling stirring apparatus to obtain a UV inkjet ink of black color.
(Black Ink Composition)

| | |
|---|---|
| LIGHT ACRYLATE L-A: | 24.4 parts |
| ACTILANE 421 (acrylate monomer, manufactured by Akcros Chemicals): | 31.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| MICROLITH BLACK C-K (pigment, manufactured by Ciba Specialty Chemicals): | 2.6 parts |
| GENORAD 16 (stabilizer, manufactured by Rahn AG): | 0.05 parts |
| RAPI-CURE DVE-3 (vinyl ether, manufactured by ISP Europe): | 5.0 parts |
| Specified sensitizing dye [Compound I-4 (having the foregoing structure)]: | 4.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared black ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

Example 6

The following components were stirred by a high-speed water-cooling stirring apparatus to obtain a UV inkjet ink of white color.
(White Ink Composition)

| | |
|---|---|
| Phenoxyethyl acrylate: | 25.0 parts |
| N-Vinylcaprolactam: | 15.0 parts |
| FA-512A [having the following structure]: | 17.4 parts |
| SOLSPERSE 36000 (dispersant, manufactured by Noveon, Inc.): | 2.0 parts |
| MICROLITH WHITE R-A (pigment, manufactured by Ciba Specialty Chemicals): | 15.0 parts |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-4 (having the foregoing structure)]: | 4.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

Comparative Example 1

The following components were stirred by a high-speed water-cooling stirring apparatus to obtain a UV inkjet ink of cyan color.

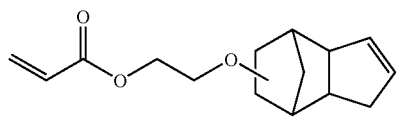

(FA-512A)

(Cyan Ink Composition for Comparison)

| | |
|---|---|
| LIGHT ACRYLATE L-A: | 21.4 parts |
| ACTILANE 421 (acrylate monomer, manufactured by Akcros Chemicals): | 30.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| IRGALITE BLUE GLVO (pigment, manufactured by Ciba Specialty Chemicals): | 3.6 parts |
| GENORAD 16 (stabilizer, manufactured by Rahn AG): | 0.05 parts |
| RAPI-CURE DVE-3 (vinyl ether, manufactured by ISP Europe): | 8.0 parts |
| LUCIRIN TPO (photopolymerization initiator, manufactured by BASF AG): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared cyan ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

Comparative Example 2

The following components were stirred by a high-speed water-cooling stirring apparatus to obtain a UV inkjet ink of cyan color.
(Cyan Ink Composition)

| | |
|---|---|
| LIGHT ACRYLATE L-A: | 21.4 parts |
| ACTILANE 421 (acrylate monomer, manufactured by Akcros Chemicals): | 30.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| IRGALITE BLUE GLVO (pigment, manufactured by Ciba Specialty Chemicals): | 3.6 parts |
| GENORAD 16 (stabilizer, manufactured by Rahn AG): | 0.05 parts |
| RAPI-CURE DVE-3 (vinyl ether, manufactured by ISP Europe): | 8.0 parts |
| 2-chlorothioxanthone: | 4.0 parts |
| LUCIRIN TPO (photopolymerization initiator, manufactured by BASF AG): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

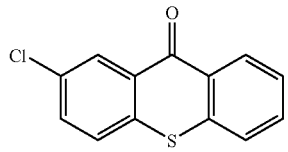

(2-Chlorothioxanthone)

<Evaluation of Ink>

The thus prepared cyan ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

Comparative Example 3

The following components were stirred by a high-speed water-cooling stirring apparatus to obtain a UV inkjet ink of cyan color.

(Cyan Ink Composition)

| | |
|---|---|
| LIGHT ACRYLATE L-A: | 21.4 parts |
| ACTILANE 421 (acrylate monomer, manufactured by Akcros Chemicals): | 30.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| IRGALITE BLUE GLVO (pigment, manufactured by Ciba Specialty Chemicals): | 3.6 parts |

-continued

| | |
|---|---|
| GENORAD 16 (stabilizer, manufactured by Rahn AG): | 0.05 parts |
| RAPI-CURE DVE-3 (vinyl ether, manufactured by ISP Europe): | 8.0 parts |
| 2,4-Diethylthioxanthone: | 4.0 parts |
| LUCIRIN TPO (photopolymerization initiator, manufactured by BASF AG): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

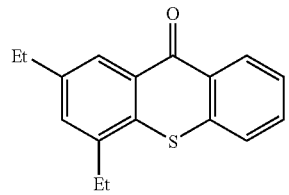

(2,4-diethylthioxanthone)

<Evaluation of Ink>

The thus prepared cyan ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

Comparative Example 4

The following components were stirred by a high-speed water-cooling stirring apparatus to obtain a UV inkjet ink of white color.
(White Ink Composition)

| | |
|---|---|
| Phenoxyethyl acrylate: | 25.0 parts |
| N-Vinylcaprolactam: | 15.0 parts |
| FA-512A [having the foregoing structure]: | 17.4 parts |
| SOLSPERSE 36000 (dispersant, manufactured by Noveon, Inc.): | 2.0 parts |
| MICROLITH WHITE R-A (pigment, manufactured by Ciba Specialty Chemicals): | 15.0 parts |
| GENORAD 16 (stabilizer, manufactured by Rahn AG): | 0.05 parts |
| RAPI-CURE DVE-3 (vinyl ether, manufactured by ISP Europe): | 8.0 parts |
| 2,4-Diethylthioxanthone: | 4.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 1 while irradiating with light rays from an iron-doped ultraviolet lamp (power: 120 W/cm$^2$). The ink composition was evaluated in the same manner as in Example 1. The obtained results are shown in Table 1.

TABLE 1

| | Sensitizing dye | Integrated light exposure quantity (mJ/cm$^2$) | Curing properties | Discharge stability |
|---|---|---|---|---|
| Example 1 | I-4 | 330 | Favorable | A |
| Example 2 | I-4 | 330 | Favorable | A |
| Example 3 | I-4 | 330 | Favorable | A |
| Example 4 | I-4 | 330 | Favorable | A |
| Example 5 | I-4 | 330 | Favorable | A |
| Example 6 | I-4 | 300 | Favorable | A |
| Comparative Example 1 | Nil | 330 | Poor | A |
| | | 660 | Poor | A |
| | | 1,000 | Favorable | A |
| Comparative Example 2 | 2-Chloro-thioxanthone | 330 | Favorable | C |

TABLE 1-continued

| | Sensitizing dye | Integrated light exposure quantity (mJ/cm$^2$) | Curing properties | Discharge stability |
|---|---|---|---|---|
| Comparative Example 3 | 2,4-Diethyl-thioxanthone | 330 | Favorable | B |
| Comparative Example 4 | 2,4-Diethyl-thioxanthone | 330 | Favorable | B |

As is clear from Table 1, all of the ink compositions including the specified sensitizing dye of the present invention of Examples 1 to 6 were excellent in curing property even when the light exposure quantity was low, compared to Comparative Example 1 which did not use a sensitizing dye, and were also excellent in discharge stability compared to Comparative Examples 2 to 4 which used a sensitizing dye other than the specified sensitizing dye of the present invention.

Example 7

The following components were stirred by a high-speed water-cooling stirring apparatus to obtain a UV inkjet ink of white color.
(White Ink Composition)

| | |
|---|---|
| LIGHT ACRYLATE L-A [lauryl acrylate: monofunctional acrylate]: | 15.4 parts |
| ACTILANE 421 (acrylate monomer, manufactured by Akcros Chemicals) [propoxylated neopentyl glycol diacrylate: bifunctional acrylate]: | 23.0 parts |
| PHOTOMER 2017 (UV diluent, manufactured by EChem): | 15.0 parts |
| SOLSPERSE 36000 (dispersant, manufactured by Noveon, Inc.): | 2.0 parts |
| MICROLITH WHITE R-A (pigment, manufactured by Ciba Specialty Chemicals): | 15.0 parts |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-4 (having the foregoing structure)]: | 8.0 parts |
| DAROCUR TPO [specified polymerization initiator (P-2)] (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 8

An ink composition was formed in the same manner as Example 1, except that the specified sensitizing dye I-4 was replaced with specified sensitizing dye I-14 (structure below). The ink composition was evaluated in the same manner as in Example 1. The obtained results are shown in Table 2.

(I-14)

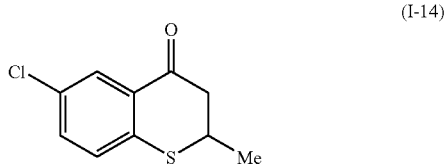

Examples 9 to 12

Ink compositions were formed in the same manner as Example 7, except that the specified sensitizing dye I-4 was replaced with the respectively specified sensitizing dyes shown in Table 2. The ink compositions were evaluated in the same manner as in Example 1. The obtained results are shown in Table 2.

Separately, ink compositions were formed in the same manner as Examples 7, 9 and 10, except that pigment was not added. The compositions without pigment were stored in the severe conditions of 60° C. for 4 weeks.

The ink composition of Example 7 after storage exhibited gelation, while the ink composition of Example 9 did not exhibit gelation although the viscosity of the ink composition slightly increased. The ink composition of Example 10 hardly changed. The results show that it is favorable for there to be fewer hydrogen atoms at the carbon atom next to the sulfur atom of Formula (I), from the viewpoint of thermal stability.

Example 13

The following components were stirred by a high-speed water-cooling stirring apparatus to obtain a UV inkjet ink of cyan color.

(Cyan Ink Composition)

| | |
|---|---|
| LIGHT ACRYLATE L-A: | 19.4 parts |
| ACTILANE 421 (acrylate monomer, manufactured by Akcros Chemicals): | 28.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| IRGALITE BLUE GLVO (pigment, manufactured by Ciba Specialty Chemicals): | 3.6 parts |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-14 (having the foregoing structure)]: | 8.0 parts |
| DAROCUR TPO (photopolymerization initiator, manufactured by Ciba Specialty Chemicals): | 8.5 parts |
| IRGACURE 907 [specified polymerization initiator] | 4.0 parts |

<Evaluation of Ink>

The thus prepared cyan ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 14

The following components were stirred by a high-speed water-cooling stirring apparatus to obtain a UV inkjet ink of magenta color.

(Magenta Ink Composition)

| | |
|---|---|
| LIGHT ACRYLATE L-A: | 13.4 parts |
| ACTILANE 421 (acrylate monomer, manufactured by Akcros Chemicals): | 34.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| CINQUASIA MAZENTA RT-355D (pigment, manufactured by Ciba Specialty Chemicals): | 3.6 parts |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-14 (having the foregoing structure)]: | 8.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared magenta ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 15

The following components were stirred by a high-speed water-cooling stirring apparatus to obtain a UV inkjet ink of yellow color.

(Yellow Ink Composition)

| | |
|---|---|
| LIGHT ACRYLATE L-A: | 8.0 parts |
| ACTILANE 421 (acrylate monomer, manufactured by Akcros Chemicals): | 43.4 parts |
| PHOTOMER 2017 (UV diluent, manufactured by EChem): | 20.0 parts |
| SOLSPERSE 32000 (dispersant, manufactured by Noveon, Inc.): | 0.4 parts |
| CROMOPHTAL YELLOW LA (pigment, manufactured by Ciba Specialty Chemicals): | 3.6 parts |
| GENORAD 16 (stabilizer, manufactured by Rahn AG): | 0.05 parts |
| RAPI-CURE DVE-3 (vinyl ether, manufactured by ISP Europe): | 4.0 parts |
| Specified sensitizing dye [Compound I-14 (having the foregoing structure)]: | 8.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared yellow ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 16

The following components were stirred by a high-speed water-cooling stirring apparatus to obtain a UV inkjet ink of black color.
(Black Ink Composition)

| | |
|---|---|
| LIGHT ACRYLATE L-A: | 22.4 parts |
| ACTILANE 421 (acrylate monomer, manufactured by Akcros Chemicals): | 29.0 parts |
| PHOTOMER 2017 (UV diluent, manufactured by EChem): | 20.0 parts |
| SOLSPERSE 32000 (dispersant, manufactured by Noveon, Inc.): | 0.4 parts |
| MICROLITH BLACK C-K (pigment, manufactured by Ciba Specialty Chemicals): | 2.6 parts |
| GENORAD 16 (stabilizer, manufactured by Rahn AG): | 0.05 parts |
| RAPI-CURE DVE-3 (vinyl ether, manufactured by ISP Europe): | 5.0 parts |
| Specified sensitizing dye [Compound I-14 (having the foregoing structure)]: | 8.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared black ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 17

The following components were stirred by a high-speed water-cooling stirring apparatus to obtain a UV inkjet ink of white color.
(White Ink Composition)

| | |
|---|---|
| Phenoxyethyl acrylate: | 25.0 parts |
| N-Vinylcaprolactam: | 15.0 parts |
| FA-512A [having the foregoing structure]: | 13.4 parts |
| SOLSPERSE 36000 (dispersant, manufactured by Noveon, Inc.): | 2.0 parts |
| MICROLITH WHITE R-A (pigment, manufactured by Ciba Specialty Chemicals): | 15.0 parts |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-14 (having the foregoing structure)]: | 8.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 18

The following components were stirred by a high-speed water-cooling stirring apparatus to obtain a UV inkjet ink of white color.
(White Ink Composition)

| | |
|---|---|
| Phenoxyethyl acrylate: | 25.0 parts |
| N-Vinylcaprolactam: | 15.0 parts |
| FA-512A [having the foregoing structure]: | 19.4 parts |
| SOLSPERSE 36000 (dispersant, manufactured by Noveon, Inc.): | 2.0 parts |
| MICROLITH WHITE R-A (pigment, manufactured by Ciba Specialty Chemicals): | 15.0 parts |
| GENORAD 16 (stabilizer, manufactured by Rahn AG): | 0.05 parts |
| RAPI-CURE DVE-3 (vinyl ether, manufactured by ISP Europe): | 2.0 parts |
| Specified sensitizing dye [Compound I-14 (having the foregoing structure)]: | 8.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 19

The following components were stirred by a high-speed water-cooling stirring apparatus to obtain a UV inkjet ink of white color.

(White Ink Composition)

| | |
|---|---|
| Phenoxyethyl acrylate: | 25.0 parts |
| N-Vinylcaprolactam: | 15.0 parts |
| FA-512A [having the following structure]: | 13.4 parts |
| SOLSPERSE 36000 (dispersant, manufactured by Noveon, Inc.): | 2.0 parts |
| MICROLITH WHITE R-A | 15.0 parts |
| (pigment, manufactured by Ciba Specialty Chemicals): | |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-17 (having the following structure)]: | 8.0 parts |
| DAROCUR TPO | 8.5 parts |
| (photopolymerization initiator, manufactured by Ciba Specialty Chemicals): | |
| IRGACURE 907 [specified polymerization initiator] | 4.0 parts |
| (photopolymerization initiator, manufactured by Ciba Specialty Chemicals): | |
| BYK 307 (defoaming agent, manufactured by BYK Chemie GmbH): | 0.05 parts |

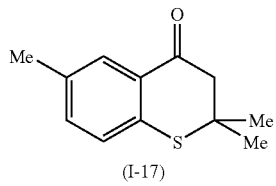

(I-17)

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 20

The following components were stirred by a high-speed water-cooling stirring apparatus to obtain a UV inkjet ink of white color.

(White Ink Composition)

| | |
|---|---|
| Phenoxyethyl acrylate: | 25.0 parts |
| N-Vinylcaprolactam: | 15.0 parts |
| FA-512A [having the foregoing structure]: | 13.4 parts |
| SOLSPERSE 36000 (dispersant, manufactured by Noveon, Inc.): | 2.0 parts |
| MICROLITH WHITE R-A | 15.0 parts |
| (pigment, manufactured by Ciba Specialty Chemicals): | |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-129 (having the following structure)]: | 8.0 parts |
| DAROCUR TPO | 8.5 parts |
| (photopolymerization initiator, manufactured by Ciba Specialty Chemicals): | |

| | |
|---|---|
| IRGACURE 2959 (IR2959) [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

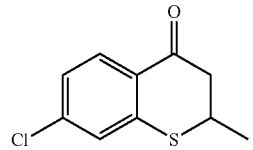

(I-129)

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 21

The following components were stirred by a high-speed water-cooling stirring apparatus to obtain a UV inkjet ink of white color.

(White Ink Composition)

| | |
|---|---|
| Phenoxyethyl acrylate: | 25.0 parts |
| N-Vinylcaprolactam: | 15.0 parts |
| FA-512A [having the foregoing structure]: | 13.4 parts |
| SOLSPERSE 36000 (dispersant, manufactured by Noveon, Inc.): | 2.0 parts |
| MICROLITH WHITE R-A (pigment, manufactured by Ciba Specialty Chemicals): | 15.0 parts |
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-71 (having the following structure)]: | 8.0 parts |
| IRGACURE 819 (photopolymerization initiator, manufactured by Ciba Specialty Chemicals): | 8.5 parts |
| IRGACURE 2959 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

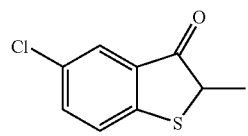

(I-71)

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Example 22

The following components were stirred by a high-speed water-cooling stirring apparatus to obtain a UV inkjet ink of white color.

(White Ink Composition)

| | |
|---|---|
| Phenoxyethyl acrylate: | 25.0 parts |
| N-Vinylcaprolactam: | 15.0 parts |
| FA-512A [having the foregoing structure]: | 13.4 parts |
| SOLSPERSE 36000 (dispersant, manufactured by Noveon, Inc.): | 2.0 parts |
| MICROLITH WHITE R-A (pigment, manufactured by Ciba Specialty Chemicals): | 15.0 parts |

| | |
|---|---|
| GENORAD 16 (stabilizer, manufactured by Rahn AG): | 0.05 parts |
| RAPI-CURE DVE-3 (vinyl ether, manufactured by ISP Europe): | 8.0 parts |
| Specified sensitizing dye [Compound I-116 (having the following structure)]: | 8.0 parts |
| IRGACURE 819 (photopolymerization initiator, manufactured by Ciba Specialty Chemicals): | 8.5 parts |
| IRGACURE 369 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

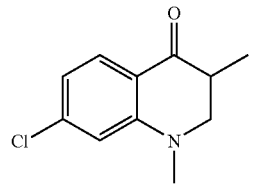

(I-116)

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

Comparative Example 5

The following components were stirred by a high-speed water-cooling stirring apparatus to obtain a UV inkjet ink of white color.

(White Ink Composition)

| | |
|---|---|
| Phenoxyethyl acrylate: | 230 parts |
| N-Vinylcaprolactam: | 15.0 parts |
| FA-512A [having the foregoing structure]: | 17.4 parts |
| SOLSPERSE 36000 (dispersant, manufactured by Noveon, Inc.): | 2.0 parts |
| MICROLITH WHITE R-A (pigment, manufactured by Ciba Specialty Chemicals): | 15.0 parts |
| GENORAD 16 (stabilizer, manufactured by Rahn AG): | 0.05 parts |
| RAPI-CURE DVE-3 (vinyl ether, manufactured by ISP Europe): | 8.0 parts |
| 2,4-Diethylthioxanthone: | 8.0 parts |
| DAROCUR TPO (photopolymerization initiator, manufactured by Ciba Specialty Chemicals): | 8.5 parts |
| IRGACURE 907 [specified polymerization initiator] (photopolymerization initiator, manufactured by Ciba Specialty Chemicals): | 4.0 parts |
| BYK 307 (defoaming agent, manufactured by BYK Chemie GmbH): | 0.05 parts |

<Evaluation of Ink>

The thus prepared white ink composition was printed on a sheet made of polyvinyl chloride and cured by passing the sheet at an appropriate speed for performing irradiation at the integrated light exposure quantity (mJ/cm$^2$) shown in Table 2 while irradiating with light rays from an iron-doped ultraviolet lamp (power: 120 W/cm$^2$). The ink composition was evaluated in the same manner as in Example 1. The obtained results are shown in Table 2.

TABLE 2

| | Sensitizing dye | Integrated light exposure quantity (mJ/cm$^2$) | Curing properties | Discharge stability |
|---|---|---|---|---|
| Example 7 | I-4 | 300 | Favorable | A |
| Example 8 | I-14 | 330 | Favorable | A |
| Example 9 | I-14 | 300 | Favorable | A |
| Example 10 | I-19 | 300 | Favorable | A |
| Example 11 | I-1 | 330 | Favorable | A |
| Example 12 | I-128 | 350 | Favorable | A |
| Example 13 | I-14 | 300 | Favorable | A |
| Example 14 | I-14 | 300 | Favorable | A |
| Example 15 | I-14 | 300 | Favorable | A |
| Example 16 | I-14 | 300 | Favorable | A |
| Example 17 | I-14 | 280 | Favorable | A |
| Example 18 | I-14 | 350 | Favorable | A |
| Example 19 | I-17 | 300 | Favorable | A |
| Example 20 | I-129 | 300 | Favorable | A |
| Example 21 | I-71 | 400 | Favorable | A |
| Example 22 | I-116 | 450 | Favorable | A |
| Comparative Example 5 | 2,4-Diethyl-thioxanthone | 300 | Favorable | C |

As is clear from Table 2, all of the ink compositions of Examples 7 to 22 of the present invention were cured with high sensitivity and were excellent in discharge stability even when the specified sensitizing dye was changed or the colorant was changed. It is clear that the ink compositions of the present invention exhibit high sensitivity compared to Comparative Example 1 in Table 1.

Also, in view of the fact that the images formed on the printed matters of Examples 1, 6, 7 to 12, and 17 to 22 developed a good white color, it is understood that according to the ink composition of the present invention, a white ink which is excellent in sensitivity and discharge stability and also excellent in color reproducibility is obtained.

On the other hand, the ink composition of Comparative Example 5, in which the sensitizing dye is not the specified sensitizing dye of the present invention, was insufficient in discharge stability while exhibiting good curing properties. Also, since the white ink of Comparative Example 5 was colored yellow due to 2,4-diethylthioxanthone which is a comparative sensitizing dye, the color reproducibility of a white image was not good.

The foregoing description of the embodiments of the present invention has been provided for the purposes of illustration and description. It is not intended to be exhaustive or to limit the present invention to the precise forms disclosed.

Obviously, many modifications and variations will be apparent to practitioners skilled in the art. The embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising: (i) a sensitizing dye represented by the following

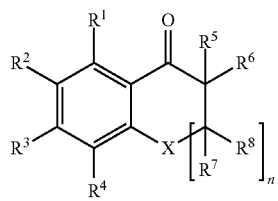

Formula (I)

wherein X represents S; n represents 1; $R^1$, $R^3$, $R^4$, $R^5$, $R^6$, $R^7$ and $R^8$ each independently represents a hydrogen atom or an alkyl group having 1 to 4 carbon atoms; and $R^2$ represents a halogen atom;

(ii) at least one polymerization initiator selected from the group consisting of an α-aminoketone represented by the following

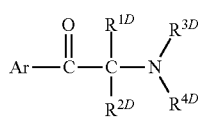

Formula (1)

wherein Ar represents a phenyl group substituted with —$SR^{13}$ or —$N(R^{7E})(R^{8E})$; $R^{13}$ represents a hydrogen atom or an alkyl group; $R^{7E}$ and $R^{8E}$ each independently represents a hydrogen atom, an alkyl group having from 1 to 12 carbon atoms, an alkyl group having from 2 to 4 carbon atoms, which is substituted with an alkoxy group having from 1 to 4 carbon atoms, or an alkenyl group having from 3 to 5 carbon atoms; $R^{1D}$ and $R^{2D}$ each independently represents an alkyl group having from 1 to 8 carbon atoms; $R^{1D}$ and $R^{2D}$ may be bonded to each other to form an alkylene group having from 2 to 9 carbon atoms; $R^{3D}$ and $R^{4D}$ each independently represents a hydrogen atom, an alkyl group having from 1 to 12 carbon atoms, an alkyl group having from 2 to 4 carbon atoms, which is substituted with an alkoxy group having from 1 to 4 carbon atoms, or an alkenyl group having from 3 to 5 carbon atoms; and $R^{3D}$ and $R^{4D}$ may be bonded to each other to form an alkylene group having from 3 to 7 carbon atoms, and the formed alkylene group may be one containing —O— or —$N(R^{12})$— in the alkylene chain thereof, wherein $R^{12}$ represents an alkyl group having from 1 to 4 carbon atoms and an acyl phosphine oxide represented by the following

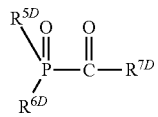

Formula (2)

or wherein $R^{5D}$ and $R^{6D}$ each independently represents an aliphatic group, an aromatic group, an aliphatic oxy group, an aromatic oxy group or a heterocyclic group; and $R^{7D}$ represents an aliphatic group, an aromatic group or a heterocyclic group;

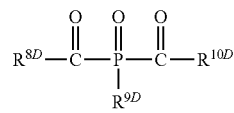

Formula (3)

wherein $R^{8D}$ and $R^{10D}$ each independently represents an alkyl group, an aryl group or a heterocyclic group; and $R^{9D}$ represents an alkyl group, an aryl group, an alkoxy group, an aryloxy group or a heterocyclic group; and (iii) an ethylenically unsaturated bond-containing polymerizable compound; wherein said ink composition is curable by exposure to active radiation rays having an output of from 50 to 800 mJ/cm².

2. The ink composition according to claim 1, further comprising a coloring agent.

3. An ink composition for inkjet recording comprising the ink composition according to claim 1.

4. The ink composition according to claim 1, wherein the sensitizing dye (i) represented by Formula (I) is contained in an amount from 0.2 to 10% by mass in terms of a solid content relative to the ink composition.

5. The ink composition according to claim 1, wherein the sensitizing dye (i) represented by Formula (I) and the at least one polymerization initiator (ii) selected from the group consisting of α-aminoketone and acyl phosphine oxide are contained in a mass ratio of (ii)/(i) from 20/1 to 1/5.

6. The ink composition according to claim 1, wherein at least one of $R^5$ and $R^6$ is a hydrogen atom, or both $R^5$ and $R^6$ are alkyl groups; and $R^2$ is a chlorine atom.

7. The ink composition according to claim 1, wherein the sensitizing dye represented by Formula (I) is selected from the group consisting of sensitizing dyes (I-4), (I-14) and (I-19):

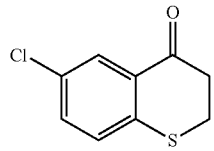

(I-4)

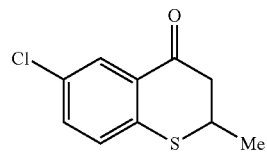

(I-14)

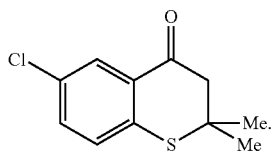
(I-19)
8. An inkjet recording method comprising:
(a) discharging the ink composition according to claim 1 onto a medium to be recorded; and
(b) irradiating the discharged ink composition with active radiation rays to cure the ink composition.
* * * * *